United States Patent [19]
Kajiura

[11] Patent Number: 5,797,027
[45] Date of Patent: Aug. 18, 1998

[54] DATA PROCESSING DEVICE AND DATA PROCESSING METHOD

[75] Inventor: Hiroyuki Kajiura, Ichihara, Japan

[73] Assignee: Sharp Kubushiki Kaisha, Osaka, Japan

[21] Appl. No.: 717,286

[22] Filed: Sep. 20, 1996

[30] Foreign Application Priority Data

Feb. 22, 1996 [JP] Japan .................................. 8-034486

[51] Int. Cl.$^6$ .................................................. G06F 13/00
[52] U.S. Cl. ............................. 395/800.11; 395/800.22
[58] Field of Search ............................. 395/800.11, 8, 395/800.22, 800.14, 800.1, 200.8

[56] References Cited

U.S. PATENT DOCUMENTS

| | | | |
|---|---|---|---|
| 4,523,273 | 6/1985 | Adams, III et al. | 395/800.11 |
| 5,276,891 | 1/1994 | Grondalski | 395/800.11 |
| 5,506,998 | 4/1996 | Kato et al. | 395/800.11 |
| 5,574,931 | 11/1996 | Letellier et al. | 395/800.11 |
| 5,619,676 | 4/1997 | Fukuda et al. | 395/464 |
| 5,708,835 | 1/1998 | Burnett | 395/800.11 |
| 5,708,836 | 1/1998 | Wilkinson | 395/800.11 |

FOREIGN PATENT DOCUMENTS 3-105584  5/1991  Japan .

OTHER PUBLICATIONS

Elliott et al, "Computational Ram: A Memory-SIMD Hybrid and its Application to DSP", CICC '92, Session 30.6 (Paper 361), pp. 1-4.

Primary Examiner—Larry D. Donaghue
Attorney, Agent, or Firm—Nixon & Vanderhye P.C.

[57] ABSTRACT

The present invention is intended to provide a parallel data-processing device comprising a plurality of ring-like interconnected processors, which is capable of conducting high-speed calculations with a plurality of matrices and neural nets. A data processing device according to the present invention comprises a plurality of interconnected unit processors each of which comprises a first data-holding means and storage means consisting of a second data-holding means and connecting means. The connecting means of each processor has inputs, outputs and a state variable. Input and output connections of the connecting means change depending upon a state of the state variable. The input of the connecting means of a processor is connected to a second output of a first neighboring processor, the output is connected to an input of second data-holding means in that processor, the input is connected to an output of first data-holding means of a second neighboring processor and the output is connected to an input of connecting means of that processor. The processors are connected to each other to form a ring circuit wherein data sets are simultaneously transferred between the processors.

12 Claims, 25 Drawing Sheets

| | 0 | 1 | 2 | 3 |
|---|---|---|---|---|
| A | X1 | X2 | X3 | X4 |
| B | W11 | W22 | W33 | W44 |
| C | W21 | W32 | W43 | W14 |
| D | W31 | W42 | W13 | W24 |
| E | W41 | W12 | W23 | W34 |
| F | | | | |
| G | | | | |
| H | | | | |
| I | | | | |
| J | | | | |
| K | | | | |
| | P0 | P1 | P2 | P3 |

(2)

| | 0 | 1 | 2 | 3 |
|---|---|---|---|---|
| A | X1 | X2 | X3 | X4 |
| B | W11 | W22 | W33 | W44 |
| C | W21 | W32 | W43 | W14 |
| D | W31 | W42 | W13 | W24 |
| E | W41 | W12 | W23 | W34 |
| F | x1W11 | x2W22 | x3W33 | x4W44 |
| G | | | | |
| H | | | | |
| I | | | | |
| J | | | | |
| K | | | | |
| | P0 | P1 | P2 | P3 |

(3)

| | 0 | 1 | 2 | 3 |
|---|---|---|---|---|
| A | X2 | X3 | X4 | X1 |
| B | W11 | W22 | W33 | W44 |
| C | W21 | W32 | W43 | W14 |
| D | W31 | W42 | W13 | W24 |
| E | W41 | W12 | W23 | W34 |
| F | x1W11 | x2W22 | x3W33 | x4W44 |
| G | | | | |
| H | | | | |
| I | | | | |
| J | | | | |
| K | | | | |
| | P0 | P1 | P2 | P3 |

(4)

| | 0 | 1 | 2 | 3 |
|---|---|---|---|---|
| A | X2 | X3 | X4 | X1 |
| B | W11 | W22 | W33 | W44 |
| C | W21 | W32 | W43 | W14 |
| D | W31 | W42 | W13 | W24 |
| E | W41 | W12 | W23 | W34 |
| F | x1W11 | x2W22 | x3W33 | x4W44 |
| G | x2W21 | x3W32 | x4W43 | x4W14 |
| H | | | | |
| I | | | | |
| J | | | | |
| K | | | | |
| | P0 | P1 | P2 | P3 |

(5)

| | 0 | 1 | 2 | 3 |
|---|---|---|---|---|
| A | X3 | X4 | X1 | X2 |
| B | W11 | W22 | W33 | W44 |
| C | W21 | W32 | W43 | W14 |
| D | W31 | W42 | W13 | W24 |
| E | W41 | W12 | W23 | W34 |
| F | x1W11 | x2W22 | x3W33 | x4W44 |
| G | x2W21 | x3W32 | x4W43 | x4W14 |
| H | | | | |
| I | | | | |
| J | | | | |
| K | | | | |
| | P0 | P1 | P2 | P3 |

(6)

| | 0 | 1 | 2 | 3 |
|---|---|---|---|---|
| A | X3 | X4 | X1 | X2 |
| B | W11 | W22 | W33 | W44 |
| C | W21 | W32 | W43 | W14 |
| D | W31 | W42 | W13 | W24 |
| E | W41 | W12 | W23 | W34 |
| F | x1W11 | x2W22 | x3W33 | x4W44 |
| G | x2W21 | x3W32 | x4W43 | x4W14 |
| H | x3W31 | x4W42 | x1W13 | x2W24 |
| I | | | | |
| J | | | | |
| K | | | | |
| | P0 | P1 | P2 | P3 |

(7)

| | 0 | 1 | 2 | 3 |
|---|---|---|---|---|
| A | X4 | X1 | X2 | X3 |
| B | W11 | W22 | W33 | W44 |
| C | W21 | W32 | W43 | W14 |
| D | W31 | W42 | W13 | W24 |
| E | W41 | W12 | W23 | W34 |
| F | x1W11 | x2W22 | x3W33 | x4W44 |
| G | x2W21 | x3W32 | x4W43 | x1W14 |
| H | x3W31 | x4W42 | x1W13 | x2W24 |
| I | | | | |
| J | | | | |
| K | | | | |
| | P0 | P1 | P2 | P3 |

(8)

| | 0 | 1 | 2 | 3 |
|---|---|---|---|---|
| A | X4 | X1 | X2 | X3 |
| B | W11 | W22 | W33 | W44 |
| C | W21 | W32 | W43 | W14 |
| D | W31 | W42 | W13 | W24 |
| E | W41 | W12 | W23 | W34 |
| F | x1W11 | x2W22 | x3W33 | x4W44 |
| G | x2W21 | x3W32 | x4W43 | x1W14 |
| H | x3W31 | x4W42 | x1W13 | x2W24 |
| I | x4W41 | x1W12 | x2W23 | x3W34 |
| J | | | | |
| K | | | | |
| | P0 | P1 | P2 | P3 |

| | 0 | 1 | 2 | 3 |
|---|---|---|---|---|
| A | X1 | X2 | X3 | X4 |
| B | W11 | W22 | 0 | 0 |
| C | W21 | W32 | 0 | 0 |
| D | W31 | W42 | 0 | 0 |
| E | W41 | W12 | 0 | 0 |
| F | | | | |
| G | | | | |
| H | | | | |
| I | | | | |
| J | | | | |
| K | | | | |
| | P0 | P1 | P2 | P3 |

(2)

| | 0 | 1 | 2 | 3 |
|---|---|---|---|---|
| A | X1 | X2 | X3 | X4 |
| B | W11 | W22 | 0 | 0 |
| C | W21 | W32 | 0 | 0 |
| D | W31 | W42 | 0 | 0 |
| E | W41 | W12 | 0 | 0 |
| F | x1W11 | x2W22 | 0 | 0 |
| G | | | | |
| H | | | | |
| I | | | | |
| J | | | | |
| K | | | | |
| | P0 | P1 | P2 | P3 |

(3)

| | 0 | 1 | 2 | 3 |
|---|---|---|---|---|
| A | X2 | X3 | X4 | X1 |
| B | W11 | W22 | 0 | 0 |
| C | W21 | W32 | 0 | 0 |
| D | W31 | W42 | 0 | 0 |
| E | W41 | W12 | 0 | 0 |
| F | x1W11 | x2W22 | 0 | 0 |
| G | | | | |
| H | | | | |
| I | | | | |
| J | | | | |
| K | | | | |
| | P0 | P1 | P2 | P3 |

(4)

| | 0 | 1 | 2 | 3 |
|---|---|---|---|---|
| A | X2 | X3 | X4 | X1 |
| B | W11 | W22 | 0 | 0 |
| C | W21 | W32 | 0 | 0 |
| D | W31 | W42 | 0 | 0 |
| E | W41 | W12 | 0 | 0 |
| F | x1W11 | x2W22 | 0 | 0 |
| G | x2W21 | x3W32 | 0 | 0 |
| H | | | | |
| I | | | | |
| J | | | | |
| K | | | | |
| | P0 | P1 | P2 | P3 |

(5)

| | 0 | 1 | 2 | 3 |
|---|---|---|---|---|
| A | X3 | X4 | X1 | X2 |
| B | W11 | W22 | 0 | 0 |
| C | W21 | W32 | 0 | 0 |
| D | W31 | W42 | 0 | 0 |
| E | W41 | W12 | 0 | 0 |
| F | x1W11 | x2W22 | 0 | 0 |
| G | x2W21 | x3W32 | 0 | 0 |
| H | | | | |
| I | | | | |
| J | | | | |
| K | | | | |
| | P0 | P1 | P2 | P3 |

(6)

| | 0 | 1 | 2 | 3 |
|---|---|---|---|---|
| A | X3 | X4 | X1 | X2 |
| B | W11 | W22 | 0 | 0 |
| C | W21 | W32 | 0 | 0 |
| D | W31 | W42 | 0 | 0 |
| E | W41 | W12 | 0 | 0 |
| F | x1W11 | x2W22 | 0 | 0 |
| G | x2W21 | x3W32 | 0 | 0 |
| H | x3W31 | x4W42 | 0 | 0 |
| I | | | | |
| J | | | | |
| K | | | | |
| | P0 | P1 | P2 | P3 |

(7)

| | 0 | 1 | 2 | 3 |
|---|---|---|---|---|
| A | X4 | X1 | X2 | X3 |
| B | W11 | W22 | 0 | 0 |
| C | W21 | W32 | 0 | 0 |
| D | W31 | W42 | 0 | 0 |
| E | W41 | W12 | 0 | 0 |
| F | x1W11 | x2W22 | 0 | 0 |
| G | x2W21 | x3W32 | 0 | 0 |
| H | x3W31 | x4W42 | 0 | 0 |
| I | | | | |
| J | | | | |
| K | | | | |
| | P0 | P1 | P2 | P3 |

(8)

| | 0 | 1 | 2 | 3 |
|---|---|---|---|---|
| A | X4 | X1 | X2 | X3 |
| B | W11 | W22 | 0 | 0 |
| C | W21 | W32 | 0 | 0 |
| D | W31 | W42 | 0 | 0 |
| E | W41 | W12 | 0 | 0 |
| F | x1W11 | x2W22 | 0 | 0 |
| G | x2W21 | x3W32 | 0 | 0 |
| H | x3W31 | x4W42 | 0 | 0 |
| I | x4W41 | x1W12 | 0 | 0 |
| J | | | | |
| K | | | | |
| | P0 | P1 | P2 | P3 |

|   | 0 | 1 | 2 | 3 |
|---|---|---|---|---|
| A | $X_1$ | $X_2$ | 0 | 0 |
| B | $W_{11}$ | $W_{22}$ | 0 | 0 |
| C | $W_{21}$ | 0 | 0 | $W_{14}$ |
| D | 0 | 0 | $W_{13}$ | $W_{24}$ |
| E | 0 | $W_{12}$ | $W_{23}$ | 0 |
| F |   |   |   |   |
| G |   |   |   |   |
| H |   |   |   |   |
| I |   |   |   |   |
| J |   |   |   |   |
| K |   |   |   |   |
|   | $P_0$ | $P_1$ | $P_2$ | $P_3$ |

(2)

|   | 0 | 1 | 2 | 3 |
|---|---|---|---|---|
| A | $X_1$ | $X_2$ | 0 | 0 |
| B | $W_{11}$ | $W_{22}$ | 0 | 0 |
| C | $W_{21}$ | 0 | $W_{43}$ | $W_{14}$ |
| D | 0 | 0 | $W_{13}$ | $W_{24}$ |
| E | 0 | $W_{12}$ | $W_{23}$ | 0 |
| F | $x_1W_{11}$ | $x_2W_{22}$ | 0 | 0 |
| G |   |   |   |   |
| H |   |   |   |   |
| I |   |   |   |   |
| J |   |   |   |   |
| K |   |   |   |   |
|   | $P_0$ | $P_1$ | $P_2$ | $P_3$ |

(3)

|   | 0 | 1 | 2 | 3 |
|---|---|---|---|---|
| A | $X_2$ | 0 | 0 | $X_1$ |
| B | $W_{11}$ | $W_{22}$ | 0 | 0 |
| C | $W_{21}$ | 0 | 0 | $W_{14}$ |
| D | 0 | 0 | $W_{13}$ | $W_{24}$ |
| E | 0 | $W_{12}$ | $W_{23}$ | 0 |
| F | $x_1W_{11}$ | $x_2W_{22}$ | 0 | 0 |
| G |   |   |   |   |
| H |   |   |   |   |
| I |   |   |   |   |
| J |   |   |   |   |
| K |   |   |   |   |
|   | $P_0$ | $P_1$ | $P_2$ | $P_3$ |

(4)

|   | 0 | 1 | 2 | 3 |
|---|---|---|---|---|
| A | $X_2$ | 0 | 0 | $X_1$ |
| B | $W_{11}$ | $W_{22}$ | 0 | 0 |
| C | $W_{21}$ | 0 | 0 | $W_{14}$ |
| D | 0 | 0 | $W_{13}$ | $W_{24}$ |
| E | 0 | $W_{12}$ | $W_{23}$ | 0 |
| F | $x_1W_{11}$ | $x_2W_{22}$ | 0 | 0 |
| G | $x_2W_{21}$ | 0 | 0 | $x_4W_{14}$ |
| H |   |   |   |   |
| I |   |   |   |   |
| J |   |   |   |   |
| K |   |   |   |   |
|   | $P_0$ | $P_1$ | $P_2$ | $P_3$ |

(5)

|   | 0 | 1 | 2 | 3 |
|---|---|---|---|---|
| A | 0 | 0 | $X_1$ | $X_2$ |
| B | $W_{11}$ | $W_{22}$ | 0 | 0 |
| C | $W_{21}$ | 0 | 0 | $W_{14}$ |
| D | 0 | 0 | $W_{13}$ | $W_{24}$ |
| E | 0 | $W_{12}$ | $W_{23}$ | 0 |
| F | $x_1W_{11}$ | $x_2W_{22}$ | 0 | 0 |
| G | $x_2W_{21}$ | 0 | 0 | $x_4W_{14}$ |
| H |   |   |   |   |
| I |   |   |   |   |
| J |   |   |   |   |
| K |   |   |   |   |
|   | $P_0$ | $P_1$ | $P_2$ | $P_3$ |

(6)

|   | 0 | 1 | 2 | 3 |
|---|---|---|---|---|
| A | 0 | 0 | $X_1$ | $X_2$ |
| B | $W_{11}$ | $W_{22}$ | 0 | 0 |
| C | $W_{21}$ | 0 | 0 | $W_{14}$ |
| D | 0 | 0 | $W_{13}$ | $W_{24}$ |
| E | 0 | $W_{12}$ | $W_{23}$ | 0 |
| F | $x_1W_{11}$ | $x_2W_{22}$ | 0 | 0 |
| G | $x_2W_{21}$ | 0 | 0 | $x_4W_{14}$ |
| H | 0 | 0 | $x_1W_{13}$ | $x_2W_{24}$ |
| I |   |   |   |   |
| J |   |   |   |   |
| K |   |   |   |   |
|   | $P_0$ | $P_1$ | $P_2$ | $P_3$ |

(7)

|   | 0 | 1 | 2 | 3 |
|---|---|---|---|---|
| A | 0 | $X_1$ | $X_2$ | 0 |
| B | $W_{11}$ | $W_{22}$ | 0 | 0 |
| C | $W_{21}$ | 0 | 0 | $W_{14}$ |
| D | 0 | 0 | $W_{13}$ | $W_{24}$ |
| E | 0 | $W_{12}$ | $W_{23}$ | 0 |
| F | $x_1W_{11}$ | $x_2W_{22}$ | 0 | 0 |
| G | $x_2W_{21}$ | 0 | 0 | $x_1W_{14}$ |
| H | 0 | 0 | $x_1W_{13}$ | $x_2W_{24}$ |
| I |   |   |   |   |
| J |   |   |   |   |
| K |   |   |   |   |
|   | $P_0$ | $P_1$ | $P_2$ | $P_3$ |

(8)

|   | 0 | 1 | 2 | 3 |
|---|---|---|---|---|
| A | 0 | $X_1$ | $X_2$ | 0 |
| B | $W_{11}$ | $W_{22}$ | 0 | 0 |
| C | $W_{21}$ | 0 | 0 | $W_{14}$ |
| D | 0 | 0 | $W_{13}$ | $W_{24}$ |
| E | 0 | $W_{12}$ | $W_{23}$ | 0 |
| F | $x_1W_{11}$ | $x_2W_{22}$ | 0 | 0 |
| G | $x_2W_{21}$ | 0 | 0 | $x_1W_{14}$ |
| H | 0 | 0 | $x_1W_{13}$ | $x_2W_{24}$ |
| I | 0 | $x_1W_{12}$ | $x_2W_{23}$ | 0 |
| J |   |   |   |   |
| K |   |   |   |   |
|   | $P_0$ | $P_1$ | $P_2$ | $P_3$ |

| | 0 | 1 | 2 |
|---|---|---|---|
| A | $a_{11}$ | $a_{12}$ | $a_{13}$ |
| B | $a_{21}$ | $a_{22}$ | $a_{23}$ |
| C | $a_{31}$ | $a_{32}$ | $a_{33}$ |
| D | $b_{11}$ | $b_{22}$ | $b_{33}$ |
| E | $b_{21}$ | $b_{32}$ | $b_{13}$ |
| F | $b_{31}$ | $b_{12}$ | $b_{23}$ |
| G | | | |
| H | | | |
| I | | | |
| J | | | |
| K | | | |
| L | | | |
| M | | | |
| N | | | |
| O | | | |
| P | | | |
| Q | | | |
| | P0 | P1 | P2 |

(2)

| | 0 | 1 | 2 |
|---|---|---|---|
| A | $a_{11}$ | $a_{12}$ | $a_{13}$ |
| B | $a_{21}$ | $a_{22}$ | $a_{23}$ |
| C | $a_{31}$ | $a_{32}$ | $a_{33}$ |
| D | $b_{11}$ | $b_{22}$ | $b_{33}$ |
| E | $b_{21}$ | $b_{32}$ | $b_{13}$ |
| F | $b_{31}$ | $b_{12}$ | $b_{23}$ |
| G | $a_{11}b_{11}$ | $a_{12}b_{22}$ | $a_{13}b_{33}$ |
| H | $a_{21}b_{11}$ | $a_{22}b_{22}$ | $a_{23}b_{33}$ |
| I | $a_{31}b_{11}$ | $a_{32}b_{22}$ | $a_{33}b_{33}$ |
| J | | | |
| K | | | |
| L | | | |
| M | | | |
| N | | | |
| O | | | |
| P | | | |
| Q | | | |
| | P0 | P1 | P2 |

(3)

| | 0 | 1 | 2 |
|---|---|---|---|
| A | $a_{12}$ | $a_{13}$ | $a_{11}$ |
| B | $a_{22}$ | $a_{23}$ | $a_{21}$ |
| C | $a_{32}$ | $a_{33}$ | $a_{31}$ |
| D | $b_{11}$ | $b_{22}$ | $b_{33}$ |
| E | $b_{21}$ | $b_{32}$ | $b_{13}$ |
| F | $b_{31}$ | $b_{12}$ | $b_{23}$ |
| G | $a_{11}b_{11}$ | $a_{12}b_{22}$ | $a_{13}b_{33}$ |
| H | $a_{21}b_{11}$ | $a_{22}b_{22}$ | $a_{23}b_{33}$ |
| I | $a_{31}b_{11}$ | $a_{32}b_{22}$ | $a_{33}b_{33}$ |
| J | | | |
| K | | | |
| L | | | |
| M | | | |
| N | | | |
| O | | | |
| P | | | |
| Q | | | |
| | P0 | P1 | P2 |

(4)

| | 0 | 1 | 2 |
|---|---|---|---|
| A | $a_{12}$ | $a_{13}$ | $a_{11}$ |
| B | $a_{22}$ | $a_{23}$ | $a_{21}$ |
| C | $a_{32}$ | $a_{33}$ | $a_{31}$ |
| D | $b_{11}$ | $b_{22}$ | $b_{33}$ |
| E | $b_{21}$ | $b_{32}$ | $b_{13}$ |
| F | $b_{31}$ | $b_{12}$ | $b_{23}$ |
| G | $a_{11}b_{11}$ | $a_{12}b_{22}$ | $a_{13}b_{33}$ |
| H | $a_{21}b_{11}$ | $a_{22}b_{22}$ | $a_{23}b_{33}$ |
| I | $a_{31}b_{11}$ | $a_{32}b_{22}$ | $a_{33}b_{33}$ |
| J | $a_{12}b_{21}$ | $a_{13}b_{32}$ | $a_{11}b_{13}$ |
| K | $a_{22}b_{21}$ | $a_{23}b_{32}$ | $a_{21}b_{13}$ |
| L | $a_{32}b_{21}$ | $a_{33}b_{32}$ | $a_{31}b_{13}$ |
| M | | | |
| N | | | |
| O | | | |
| P | | | |
| Q | | | |
| | P0 | P1 | P2 |

(5)

| | 0 | 1 | 2 |
|---|---|---|---|
| A | $a_{13}$ | $a_{11}$ | $a_{12}$ |
| B | $a_{23}$ | $a_{21}$ | $a_{22}$ |
| C | $a_{33}$ | $a_{31}$ | $a_{32}$ |
| D | $b_{11}$ | $b_{22}$ | $b_{33}$ |
| E | $b_{21}$ | $b_{32}$ | $b_{13}$ |
| F | $b_{31}$ | $b_{12}$ | $b_{23}$ |
| G | $a_{11}b_{11}$ | $a_{12}b_{22}$ | $a_{13}b_{33}$ |
| H | $a_{21}b_{11}$ | $a_{22}b_{22}$ | $a_{23}b_{33}$ |
| I | $a_{31}b_{11}$ | $a_{32}b_{22}$ | $a_{33}b_{33}$ |
| J | $a_{12}b_{21}$ | $a_{13}b_{32}$ | $a_{11}b_{13}$ |
| K | $a_{22}b_{21}$ | $a_{23}b_{32}$ | $a_{21}b_{13}$ |
| L | $a_{32}b_{21}$ | $a_{33}b_{32}$ | $a_{31}b_{13}$ |
| M | | | |
| N | | | |
| O | | | |
| P | | | |
| Q | | | |
| | P0 | P1 | P2 |

(6)

| | 0 | 1 | 2 |
|---|---|---|---|
| A | $a_{13}$ | $a_{11}$ | $a_{12}$ |
| B | $a_{23}$ | $a_{21}$ | $a_{22}$ |
| C | $a_{33}$ | $a_{31}$ | $a_{32}$ |
| D | $b_{11}$ | $b_{22}$ | $b_{33}$ |
| E | $b_{21}$ | $b_{32}$ | $b_{13}$ |
| F | $b_{31}$ | $b_{12}$ | $b_{23}$ |
| G | $a_{11}b_{11}$ | $a_{12}b_{22}$ | $a_{13}b_{33}$ |
| H | $a_{21}b_{11}$ | $a_{22}b_{22}$ | $a_{23}b_{33}$ |
| I | $a_{31}b_{11}$ | $a_{32}b_{22}$ | $a_{33}b_{33}$ |
| J | $a_{12}b_{21}$ | $a_{13}b_{32}$ | $a_{11}b_{13}$ |
| K | $a_{22}b_{21}$ | $a_{23}b_{32}$ | $a_{21}b_{13}$ |
| L | $a_{32}b_{21}$ | $a_{33}b_{32}$ | $a_{31}b_{13}$ |
| M | $a_{13}b_{31}$ | $a_{11}b_{12}$ | $a_{12}b_{23}$ |
| N | $a_{23}b_{31}$ | $a_{21}b_{12}$ | $a_{22}b_{23}$ |
| O | $a_{33}b_{31}$ | $a_{31}b_{12}$ | $a_{32}b_{23}$ |
| P | | | |
| Q | | | |
| | P0 | P1 | P2 |

DATA PROCESSING DEVICE AND DATA PROCESSING METHOD

BACKGROUND OF THE INVENTION

A single instruction multi-data (SIMD) parallel data-processing device has been used for processing a large number of data at a high speed. The data processing device comprises a plurality of local memories, a plurality of processors, a control unit, a global bus, an interprocessor bus and local buses for connecting respective local memories to corresponding processors. Each processor and each local memory are connected to each other through a local bus. Each processor reads data to be used for calculation from its local memory and writes data into the local memory through a local memory-processor bus. Each processor is connected to the control unit through a global bus through which it receives from the control unit instructions to be performed and data to be stored into a local memory. Data read out by the processor from the local memory is also transferred through the global bus to the control unit. Neighboring processors are interconnected in turn by respective interprocessor buses. Two neighbors can interchange data between them through the interprocessor bus.

On the other hand, IC memories are generally made of matrix structure. One type of IC memories is a function memory having simple processors built one in each row or column of its matrix. This function memory comprises a memory portion, a processor portion, a row decoder driving portion, a column decoder driving portion and a control circuit portion. The memory can be used as a usual memory and be further applied for parallel processing data by row or column in its memory matrix by using SIMD type processors incorporated in its integrated circuit. Each built-in processor can transfer data to and receive data from its neighbor.

A processor portion of a function memory is described in "Computational Ram: A Memory-SIMD Hybrid and its Application to DSP" CICC '92. The function memory comprises an X-register, a Y-register, a write-permission register, a one-bit ALU (arithmetic and logic unit) and a global instruction line. The X-register and the Y-register are single-bit universal type registers. Each processor can write data in the X-register of the right-side neighboring processor and the Y-register of the left-side neighboring processor. The write-permission register of single-bit structure allows the processor to write a resultant in the memory when a digit "1" is indicated.

A parallel data-processing device having ring-like interconnected trays is disclosed in Japanese Laid-Open Patent Publication No. 3-105584.

This data processing device comprises a plurality of data-processing units, a plurality of trays, a plurality of memories and bypass means. The trays are linked with each other to form a loop. Each data processing unit is provided with one tray and one memory. The number of trays contained in the loop can be freely adjusted by interposing a data-bypass selector circuit in a connecting line between neighboring trays.

In this parallel data-processing device, a product of n×m-degree matrix elements and n-degree vectors is calculated in the following manner: Elements in the i-th row of the matrix are input into the i-th memory ($1 \leq i \leq m$) and the j-th vector-elements are input into the j-th tray ($1 \leq j \leq m$). In each data-processing unit, the k-th data-processing is performed to determine a sum of products of elements in the k-th row of the memory and the vector-elements stored in the tray. The content of the tray is then transferred to a neighboring processing unit. The above-mentioned process is repeated by the succeeding processors by n-times to get a product of the n×m-degree matrix and the n-degree vectors.

Namely, this parallel data-processing device can effectively perform parallel operations on a matrix of any size or a neural net.

In the above-mentioned conventional parallel data-processing devices, each processing unit can receive data from and transfer data to each of two neighbors at its both sides. Consequently, parallel product-summing operations on matrices or a neural net requires an additional process for transferring data to separate processing units, causing an overhead of processing time.

Now it is supposed that a SIMD type parallel data-processing device having n pieces of processors is applied for calculating a product of two matrices each having a size of n×n on the condition that one process to be performed by the device consists of one cycle of one product-summing operation, one cycle of transferring data to neighboring processors and one cycle of transferring data to apart existing processors. This means that the data processing device must perform n×n cycles of product-summing operation, n×n cycles of transferring data to neighboring processors and n×n cycles of transferring data to apart existing processors. It takes $3n^2$ cycles of processing time in total. Namely, a ⅓ of the processing time is an overhead time. The calculation on a matrix or a neural net of several dimensions may cause a not-considerable overhead, whereas the calculation on a matrix or a neural net having several hundred or thousand dimensions may cause a remarkable overhead for transferring data between separate processors.

A conventional parallel data-processing device has a loop of trays and can therefore conduct a product-sum calculation of one matrix or neural net with no overhead for transferring data to separate processors but it must perform separate operations on each of two or more matrices or neural nets.

SUMMARY OF THE INVENTION

The present invention relates to a data-processing device and its method and more particularly to a data-processing device which is capable of performing high-speed data-processing of a number of product-sums such as products of matrices or vectors and calculations on digital neural nets and a product-sum calculating method using said data-processing device.

The present invention has as its object the provision of a parallel data-processing device, which is free from the above-mentioned problems of the prior arts devices and can therefore conduct high-speed parallel data-processing when computing a plurality of matrices and neural nets, as well as the provision of a method for processing data by using said device.

(1) The present invention is directed to provide a data processing device which includes one-dimensionally or multi-dimensionally interconnected processors each of which comprises a first data-holding means for storing data and a storage means each consisting of one or more second data holding means for storing data and a connecting means, and which is featured in that the connecting means of each processor has at least two inputs, at least two outputs and a state variable for setting input-output connections: a first input of the connecting means is connected to a second output of connecting means of a first physically or logically neighboring processor; a first output of the connecting means is connected to an input of the second data-holding means disposed in the same memory means wherein the connecting means exists; a second input of the connecting means is connected to an output of a first data-holding means of connecting means of a second physically or logically neighboring processor; a second output of the connecting means is connected to a first input of the first data-holding means of connecting means of a second physically or logically neighboring processor, and the input-output connections of the connecting means can be changed by changing a value of the state variable to allow the connection state of the processor to change depending upon a value of the state variable of the connecting means and thereby to allow data to be transferred to a physically or logically separated processors and further to enable rotation of data between physically or logically succeeding processors.

(2) The present invention is directed to provide a data-processing device mentioned in the above (1) and further characterized in that an output of the first data-holding means of the processor located at a physical or logical terminal point, because of absence of the connecting means of the first neighboring processor, is connected to the first input of the processor so that the processor is included into a group of physically or logically succeeding processors wherein data can be rotated.

(3) The present invention is directed to provide a data processing device mentioned in the above (1) or (2) and further characterized in that the connecting means has, as first inputs and second outputs, at least two respective inputs, and at least two respective outputs, which first inputs and second outputs of the connecting means are connected to the second outputs and the first inputs, respectively, of the first and the second neighboring processors, and the first data-holding means has two outputs which first output is connected to the second inputs, respectively, of the connecting means of the first and the second neighboring processors so that the connections of the processor may change depending upon a value of the state variable of the connecting means to enable the processor to transfer data in two directions to any processor located at a physically or logically separated therefrom place.

(4) The present invention provides a data processing device which includes one-dimensionally or multi-dimensionally interconnected processors each of which comprises a first data-holding means for storing data and a storage means each consisting of of one more second data-holding means for storing data and a connecting means, and which is featured in that the connecting means of each processor has at least three inputs, at least three outputs and a state variable for setting input-output connections, the second input and the second output of the connecting means are connected to a first output and a first input, respectively, of connecting means of a first physically or logically neighboring processor; the first input and the first output of the connecting means are connected to a second output and a second input, respectively, of connecting means of a second physically or logically neighboring processor; the third output of the connecting means is connected to an input of the data holding means disposed in the same storage means wherein the connecting means exists; the third input of the connecting means is connected to the output of the first data-holding means; and the above-mentioned input-output connections of the connecting means can be changed by changing a value of the state variable to allow the connection state of the processor to change depending upon a value of the state variable of the connecting means and thereby to allow data to be transferred to a physically or logically distant processors and further to enable rotation of data between physically or logically succeeding processors.

(5) The present invention provides a SIMD type parallel data-processing device which comprises one-dimensionally or multi-dimensionally connected processors each of which comprises data processing means, memory means and one or more storage means each consisting of a first register means and a connecting means, wherein an output of the memory means is connected to a first input of the data processing means, an output of the first register means is connected to a second input of the data processing means, a first output of the data processing means is connected to an input of the memory means, a first output of the connecting means is connected to a first input of the first register means disposed in the same storage means wherein the connecting means exists, a second output of the connecting means is connected to a first input of connecting means of a second physically or logically neighboring processor, a second output of the data processing means is connected to a second input of connecting means of a first physically or logically neighboring processor, a fourth output of the data processing means is connected to a third input of connecting means, and the connections of the first and second inputs and the first and second outputs of the connecting means can be changed according to a value of the third input of the connecting means to change the condition of interprocessor connections according to a value of the third input of the connecting means, thereby enabling each processor to transfer data to any physically or logically distant processor and allowing data to rotate among the physically or logically successive processors in a group.

(6) The present invention provides a data processing device mentioned in the above (5) and further characterized in that the processor, which is located at a physical or logical terminal point and whose connecting means has a second free output because there is no connectable thereto connecting means of the first physically or logically neighboring processor, can be included into a group of physically or logically successive processors by connecting the second output of the connecting means to the first input of the same connecting means, thereby enabling data to rotate in the group of the successively interconnected processors.

(7) The present invention provides a data processing device mentioned in the above (5) or (6) and further characterized in that the connecting means has second register means connected to a third input of the connecting means, said second register means maintains a value of the third input of the connecting means and the connections of the first and second inputs and the first and second outputs of the connecting means can be changed by changing a value of the third input of the connecting means to change the condition of interprocessor connections depending upon a value of the third input of the connecting means, thereby enabling each processor to transfer data to any physically or logically distant processor and allowing data to rotate among the physically or logically successive processors in a group.

(8) The present invention provides a data processing device mentioned in any one of the above (5) to (7) and further characterized in that in the processor, a third output of the data processing means is connected to a second input of the first register means so as to enable the data processing means to directly transfer data to the register means of the same processor without passing the connecting means.

(9) The present invention provides a data processing device mentioned in any one of the above (5) to (8) and further characterized in that the processor has an input-output port in place of an input and an output of the memory means, has an input-output port in place of a first and second inputs and output of the first register means and has an input-output port in place of a first and second inputs and first, second and third outputs of the data processing means, and each of the input-output ports and first and second inputs of the connecting means is connected to a first common-use bus to enable the data processing means to transfer data to and receive data from the memory means, the first register means and the connecting means through the common bus.

(10) The present invention provides a data processing device mentioned in any one of the above (5) to (9) and further characterized in that in the processor including a plurality of storage means, a fourth output of the data processing means and a third output of the connecting means are connected to a second common-use bus to enable transmission of data between the data processing means and the connecting means.

(11) The present invention provides a method for performing computational (arithmetic) operations on a neural net combining m pieces of nodes $X_i$ ($1 \leq i \leq m$) of a first layer with n pieces of nodes $Y_j$ ($1 \leq j \leq n$) of a second layer by using a data processing device mentioned in any one of the above (5) to (9), which method uses the larger successive number m or n (hereinafter denoted by P) of the processors to store an output of a node $X_k$ of the first layer into memory means of the k-th ($1 \leq k \leq P$) processor or stores 0 thereinto in the absence of the corresponding node, store a coefficient $W_{ik}$ ($1 \leq i \leq m$) for combining each node $X_i$ ($1 \leq i \leq m$) of the first layer with a k-th node $Y_k$ of the second layer and $W_{pk}$ (p is a remainder after dividing (i+k−1) by P but it takes P if 0) into an address accessible by the processors at the same time or store 0 in the absence of the corresponding coefficient, rotate the output of the node X to the right or the left by setting the connecting means so as to rotate the output of the data processing means to the right or the left, determine a sum of the products of an output of the node X and the coefficient by each processor to get an output of the node Y, thus making it possible to determine an output of a node $B_j$ ($1 \leq j \leq n$) in the neural net combining m pieces of nodes $A_i$ ($1 \leq i \leq m$) of the first layer with n pieces of nodes $B_j$ ($1 \leq j \leq n$) of the second layer.

(12) The present invention provides a method for calculating a product of a matrix A having a size of n×m by a matrix B having a size of m×1 by using a data processing device mentioned in any one of the above (5) to (9), which method uses the larger successive number m or 1 (denoted by P) of the processors to store elements $a_{ik}$ ($1 \leq i \leq n$) in a k-th column of the matrix A into memory means of the k-th ($1 \leq k \leq P$) processor or stores 0 thereinto in the absence of the corresponding elements of the matrix A, store data in the same row into an address accessible by the processors at the same time, store data $b_{ij}$ ($1 \leq i \leq m$) in the j-th column of the matrix B and $b_{pj}$ (p is a remainder after dividing (i+j−1) by P but it takes P if 0) into an address accessible by the processors at the same time or store 0 in the absence of the corresponding elements of the matrix B, rotate the output of the data of the matrix A to the right or the left by setting the connecting means so as to rotate the output of the data processing means to the right or the left, determine a sum of the products of the elements of the matrices A and B by each processor, thereby making it possible to determine the product of the matrix of n×m in size and the matrix of m×1 in size.

BRIEF DESCRIPTION OF THE DRAWINGS

FIG. 26 is a view for explaining a method for calculating with a neural net of FIG. 25A by a data processing device according to the present invention.

FIG. 27 is a view for explaining a method for calculating with a neural net of FIG. 25C by a data processing device according to the present invention.

FIG. 28 is a view for explaining a method for calculating with a neural net of FIG. 25B by a data processing device according to the present invention.

FIG. 30 is view for explaining a method for calculating a product of two matrices by using a data processing device according to the present invention.

PREFERRED EMBODIMENT OF THE INVENTION

To begin with, prior arts will be described below as references to the present invention.

Figure 1:
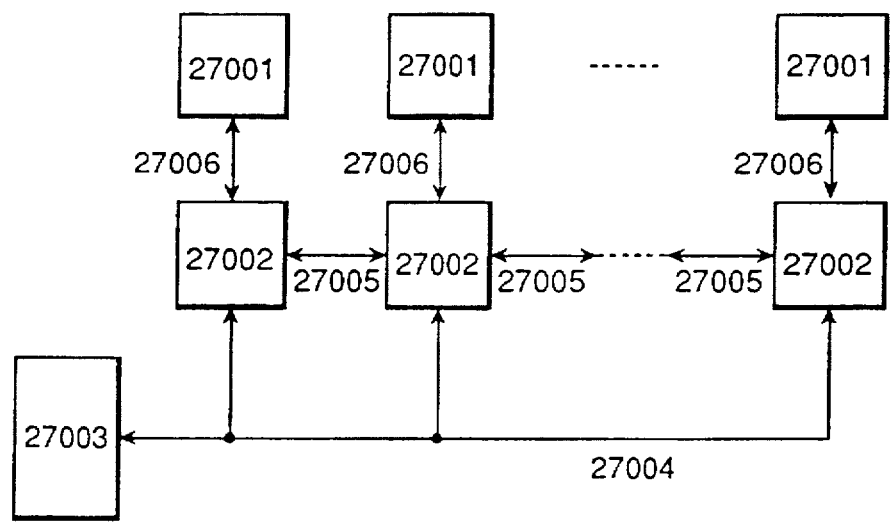
FIG. 1 sows an example of a SIMD type parallel data processing device according to a prior art.

A single instruction multi-data (SIMD) parallel data-processing device shown in FIG. 1 has been used for processing a large number of data at a high speed. In FIG. 1, the data processing device comprises a plurality of local memories (27001), a plurality of processors (27002), a control unit (27003), a global bus (27004), an interprocessor bus (27005) and local buses (27006) for connecting respective local memories to corresponding processors. Each processor and each local memory are connected to each other through a local bus. Each processor reads data to be used for calculation from its local memory and writes data into the local memory through a local memory-processor bus. Each processor is connected to the control unit through a global bus through which it receives from the control unit instructions to be performed and data to be stored into a local memory. Data read out by the processor from the local memory is also transferred through the global bus to the control unit. Neighboring processors are interconnected in turn by respective interprocessor buses. Two neighbors can interchange data between them through the interprocessor bus.

Figure 2:
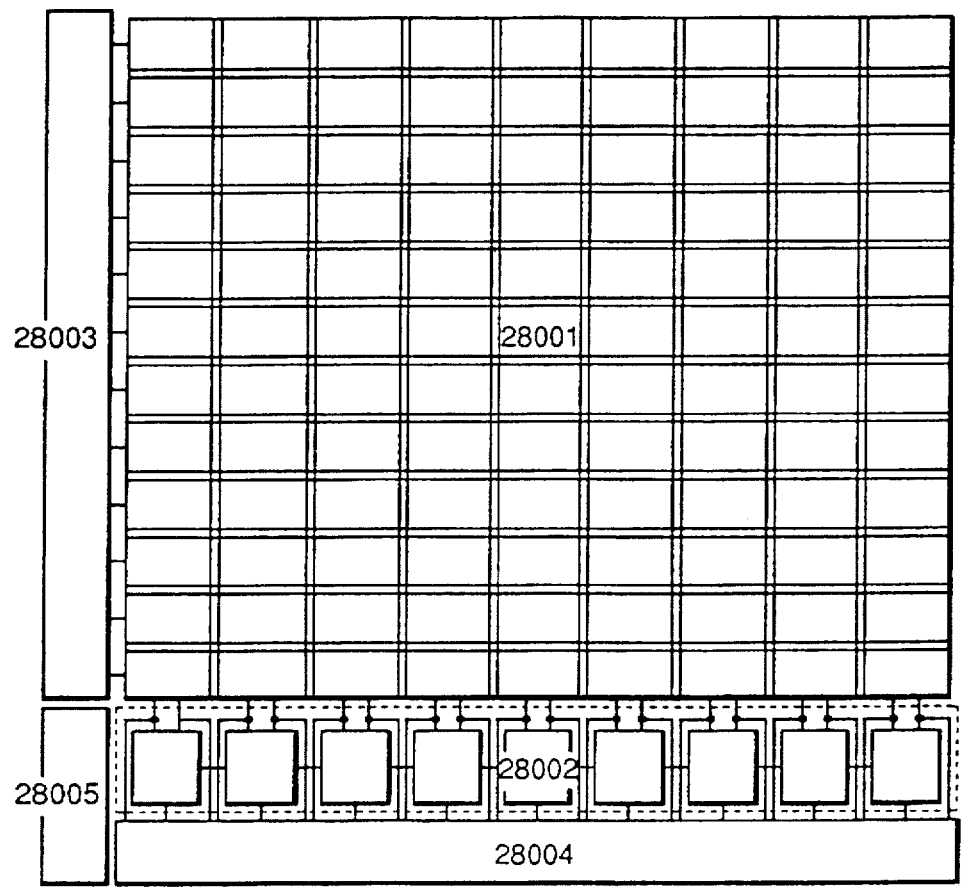
FIG. 2 shows an example of a function memory incorporating a processor according to a prior art.

On the other hand, IC memories are generally made of matrix structure. One type of IC memories is a function memory having simple processors built one in each row or column of its matrix, as shown in FIG. 2. This function memory comprises a memory portion (28001), a processor portion (28002), a row decoder driving portion (28003), a column decoder driving portion (28004) and a control circuit portion (28005). The memory can be used as a usual memory and be further applied for parallel processing data by row or column in its memory matrix by using SIMD type processors incorporated in its integrated circuit. Each built-in processor can transfer data to and receive data from its neighbor.

Figure 3:
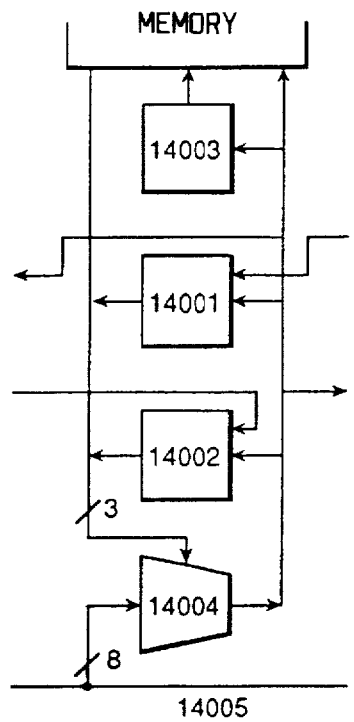
FIG. 3 shows an exemplified structure of a processor incorporated in a function memory according to a prior art.

FIG. 3 shows the structure of a processor portion of a function memory is described in "Computational Ram: A Memory-SIMD Hybrid and its Application to DSP" CICC '92. The function memory comprises an X-register (14001), a Y-register (14002), a write-permission register (14003), a one-bit ALU (arithmetic and logic unit) and a global instruction line (14005). The X-register and the Y-register are single-bit universal type registers. Each processor can write data in the X-register of the right-side neighboring processor and the Y-register of the left-side neighboring processor. The write-permission register of single-bit structure allows the processor to write a resultant in the memory when a digit "1" is indicated.

Figure 4:
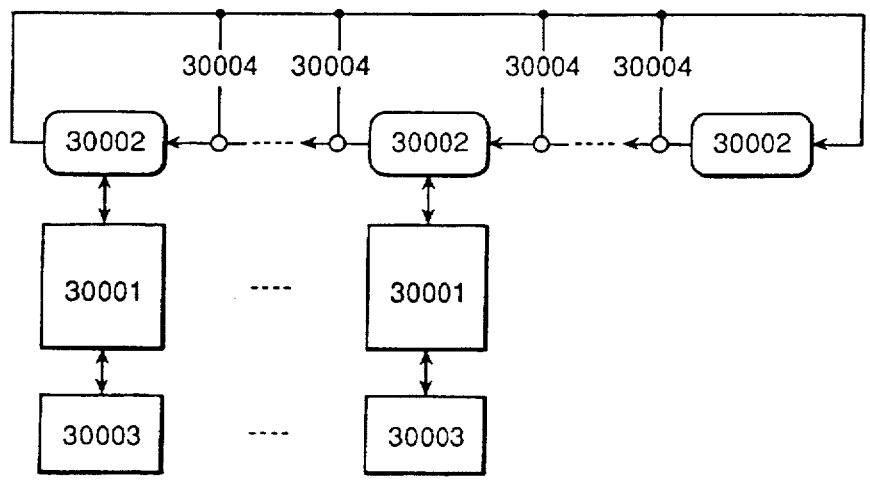
FIG. 4 is a principle structure of a conventional parallel data processing device with a ring-type shift-register.

FIG. 4 shows the principle structure of a parallel data-processing device having ring-like interconnected trays, which is disclosed in Japanese Laid-Open Patent Publication No. 3-105584.

This data processing device comprises a plurality of data-processing units (30001), a plurality of trays (30002), a plurality of memories (30003) and bypass means (30004). The trays are linked with each other to form a loop. Each data processing unit is provided with one tray and one memory. The number of trays contained in the loop can be freely adjusted by interposing a data-bypass selector circuit in a connecting line between neighboring trays.

In this parallel data-processing device, a product of n×m-degree matrix elements and n-degree vectors is calculated in the following manner: Elements in the i-th row of the matrix are input into the i-th memory ($1 \leq i \leq m$) and the j-th vector-elements are input into the j-th tray ($1 \leq j \leq m$). In each data-processing unit, the k-th data-processing is performed to determine a sum of products of elements in the k-th row of the memory and the vector-elements stored in the tray. The content of the tray is then transferred to a neighboring processing unit. The above-mentioned process is repeated by the succeeding processors by n-times to get a product of the n×m-degree matrix and the n-degree vectors.

Namely, this parallel data-processing device can effectively perform parallel operations on a matrix of any size or a neural net.

EMBODIMENT 1

Figure 5:
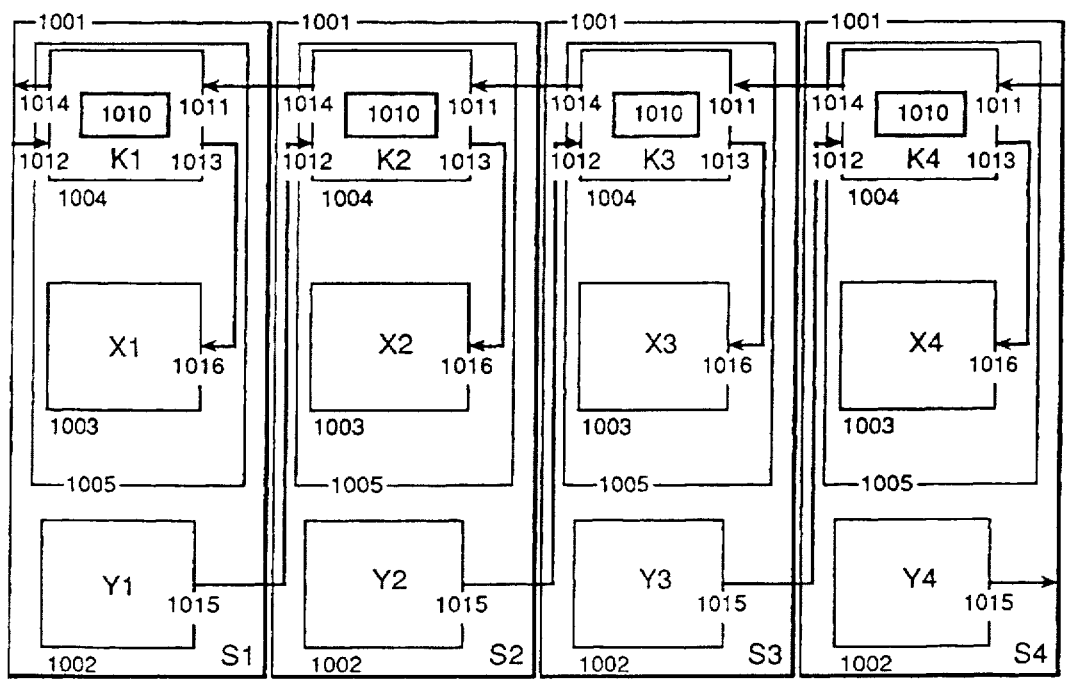
FIG. 5 is a view of an embodiment of a data processing device according to the present invention.

Referring to FIG. 5, a data processing device, which is an embodiment of the present invention, will be explained as follows:

The embodiment of the present invention comprises one-dimensionally interconnected processors (1001) each of which consists of first data-holdinig means (1002) and storage means (1005) composed of second data-holding means (1003) and connecting means (1004).

The connecting means has two inputs (1011, 1012), two outputs (1013, 1014) and a state variable (1010) that can assume two possible states. The first input (1011) of the connecting means is connected to a second output (1014) of connecting means of a right processor, the first output (1013) of the connecting means is connected to an input (1016) of the second data-holding means, the second input (1012) of the connecting means is connected to an output (1015) of a first data-holding means of a left processor, the second output (104) of the connecting means is connected to a first input (1011) of connecting means of the left processor.

With the state variable set in its first state, the first input and the first output are interconnected and the second input and the second output are interconnected, whilst with the state variable set in its second state, the first input and the second output are interconnected and the second output and the second input are interconnected.

Figure 6A:
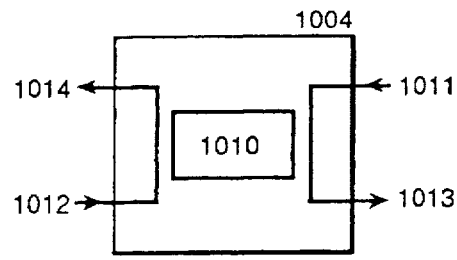
FIGS. 6A and 6B show working conditions of connecting means shown in FIG. 5, which takes state A and state B depending upon a state variable.
Figure 6B:
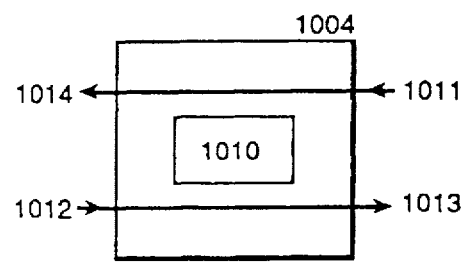

FIGS. 6A and 6B are views showing connecting states of the connecting means: FIG. 6A shows the first state of the state variable and FIG. 6B shows the second state of the state variable.

When the state variables for the connecting means K1 and K4 of the processors S1 and S4 are set in the second state and the state variables for its connecting means K2 and K3 of the processors S2 and S3 are set in its second state, the output of the first data-holding means Y1 of the processor S1 is connected to the input of the second data-holding means X2 of the processor S2, the output of the first data-holding means Y2 of the processor S2 is connected to the input of the second data-holding means X3 of the processor S3 and the output of the first data-holding means Y3 of the processor S3 is connected to the input of the second data-holding means X1 of the processor S1. Namely, the processors S1, S2 and S3 are interconnected to form a loop in which data rotates from left to right.

The shown embodiment includes 4 processors but can also use more processors in the same mariner.

Figure 7:
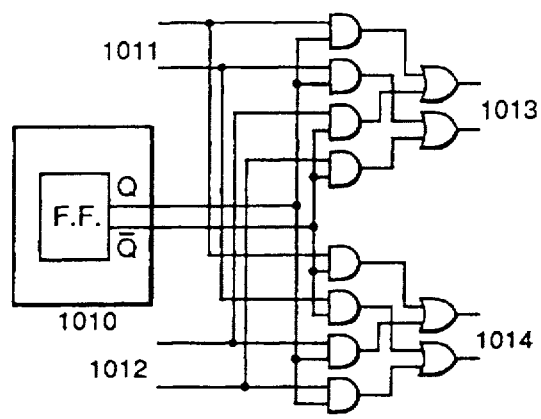
FIG. 7 shows an example of connecting means shown in FIG. 5.
Figure 8:
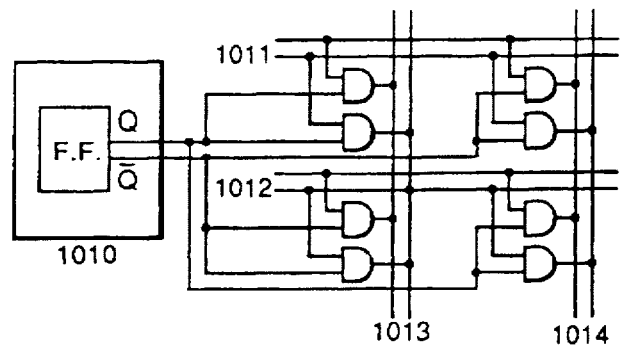
FIG. 8 shows an example of connecting means shown in FIG. 5.

FIGS. 7 and 8 show an example of connecting means of the embodiment of FIG. 5, which is made on an electronic circuit with two-wired inputs (1011, 1012) and two-wired outputs (1013, 1014).

In this example, a flip-flop serves as the state variable. When the flip-flop (F.F.) assumes 1 (i.e., the first state), a first input (1011) is connected to a first output (1013) and a second input (1012) is connected to a second output (1014). When the flip-flop assumes 0 (i.e., the second state), the first input (1011) is connected to the second output, (1014) and the second input (1012) is connected to the first output (1013).

Figure 9:
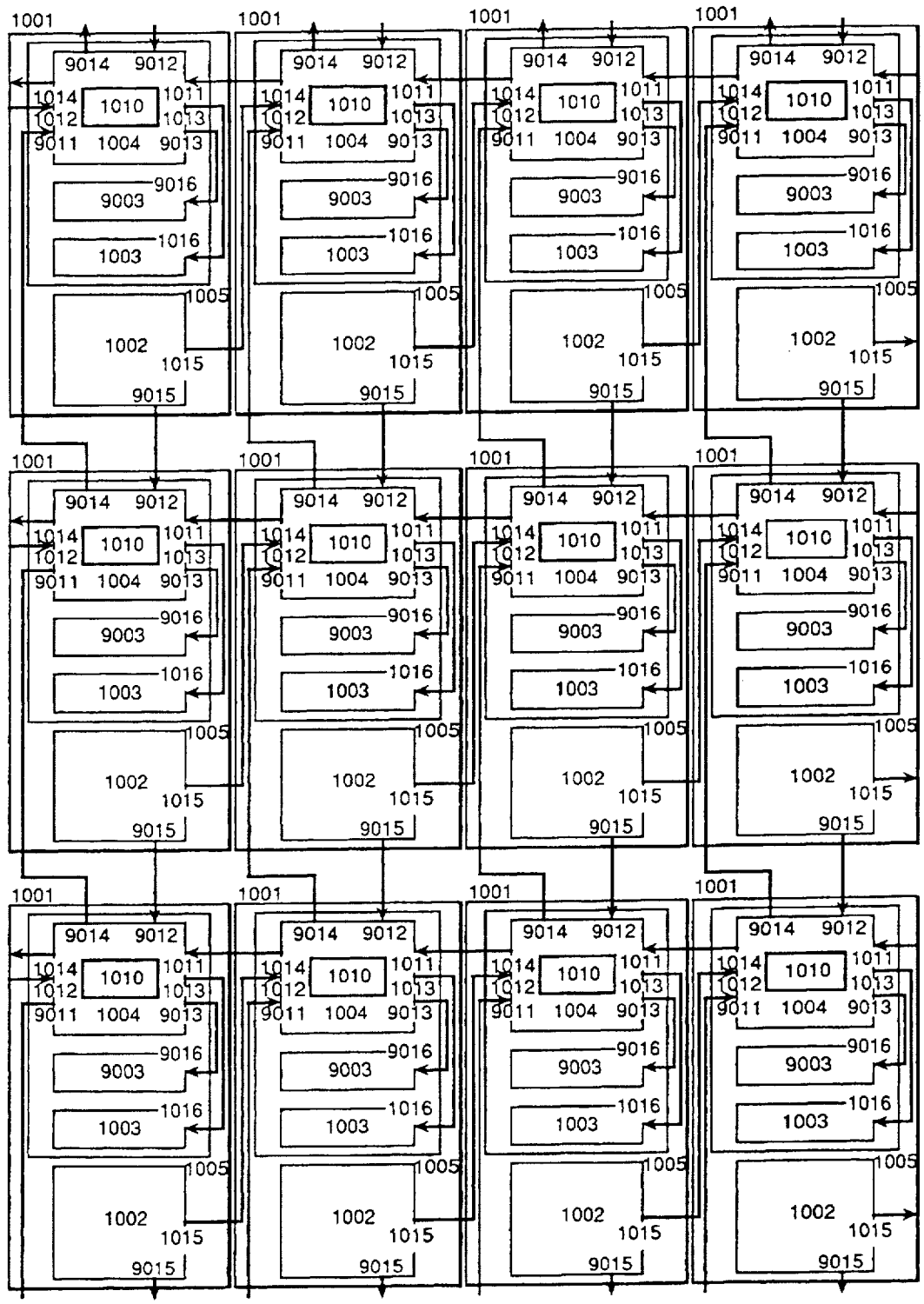
FIG. 9 is a view of an embodiment of a data processing device according to the present invention.

Referring, to FIG. 9, a data processing device which is an embodiment of the present invention. In FIG. 9, components similar to those shown in FIG. 5 are given the same numerals and will not be further described.

This data processing device differs from the embodiment shown in FIG. 5 by the fact that processors (1001) are arranged in a two-dimensional matrix and each of the processors is further provided with second data holding means (9003) whose input (9016) is connected to the first output (1013) of the connecting means.

To interconnect the processors aligned in vertical direction (columns), an output (9015) of the first data holding means of a processor in a column of the matrix is connected to a second input (9012) of its connecting means and a second output (9014) of its connecting means is connected to a first input (9011) of connecting means of another processor disposed above in the column.

As a result of this, the connecting means of the processor are connected with connecting means of neighboring processors in the row and column of the two-dimensional system. There are 24 (4×3×2) kinds of input-output connections of the connecting means as well as 24 states of the state variable.

Although the shown embodiment uses 12 processors (4 in a row×3 in a column), it may include a larger number of processors in the same way as described above. The processors of the embodiment are arranged in a two-dimensional system, but they may also be more than three-dimensionally arranged.

EMBODIMENT 2

Figure 10:
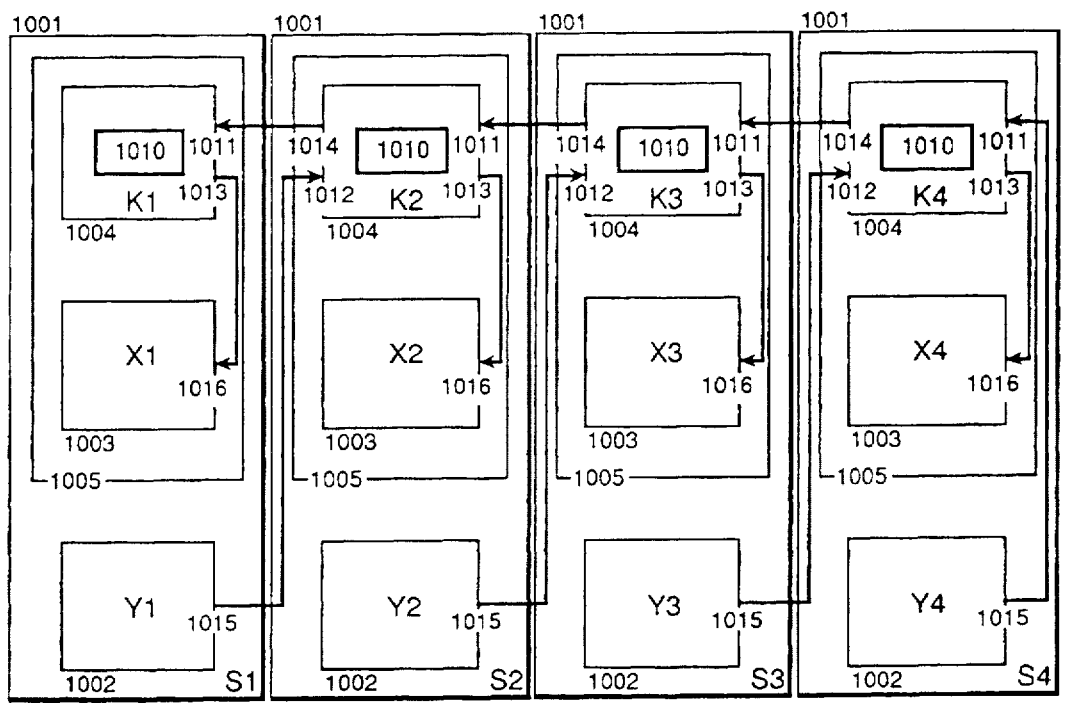
FIG. 10 is a view of an embodiment of a data processing device according to the present invention.

Referring to FIG. 10, a data processing device which is an embodiment of the present invention. In FIG. 10, components similar to those shown in FIG. 5 are given the same numerals and will not be further described.

This data processing device differs from the embodiment shown in FIG. 5 by the fact that processors S1 and S4 are disposed at terminal points, i.e., connecting means K1 of the processor S1 has no second output (1014) nor second input (1012) and an output (1015) of first data-holding means Y4 of the processor S4 is connected to a first input (1011) of connecting means K4.

When the state variable of the connecting means K1 of the processor S1 assumes the first state and the state variables of the connecting means K2, K3, K4 of the processors S2, S3 and S4 assume the second state, an output of the first data-holding means Y1 of the processor S1 is connected to an input of the second data-holding means X2 of the processor S2, an output of the first data-holding means Y2 of the processor S2 is connected to an input of the second data-holding means X3 of the processor S3, an output of -the first data-holding means Y3 of the processor S2 is connected to an input of the second data-holding means X4 of the processor S3 and an output of the first data-holding means Y4 of the processor S3 is connected to an input of the second data-holding means X1 of the processor S1. Namely, the processors S1, S2, S3, S4 are interconnected to form a loop wherein data is rotated from left to right.

When the state variables of the connecting means of all processors are set in the first state, the output of the first data-holding means Y1 of the processor S1 is connected to the input of the second data-holding means X1 of the processor S2, the output of the first data-holding means Y2 of the processor S2 is connected to the input of the second data-holding means X2 of the processor S3, the output of the first data-holding means Y3 of the processor S2 is connected to the input of the second data-holding means X3 of the processor S3 and the output of the first data-holding means Y4 of the processor S3 is connected to the input of the second data-holding means X4 of the processor S1. Namely, the first data-holding means of each processor is connected to the second data-holding means of the same processor.

Although the shown embodiment uses 4 processors, it may include a larger number of processors in the same way as described above. The processors are arranged one-dimensionally in the embodiment, but they may also be two or more-dimensionally arranged.

EMBODIMENT 3

Figure 11:
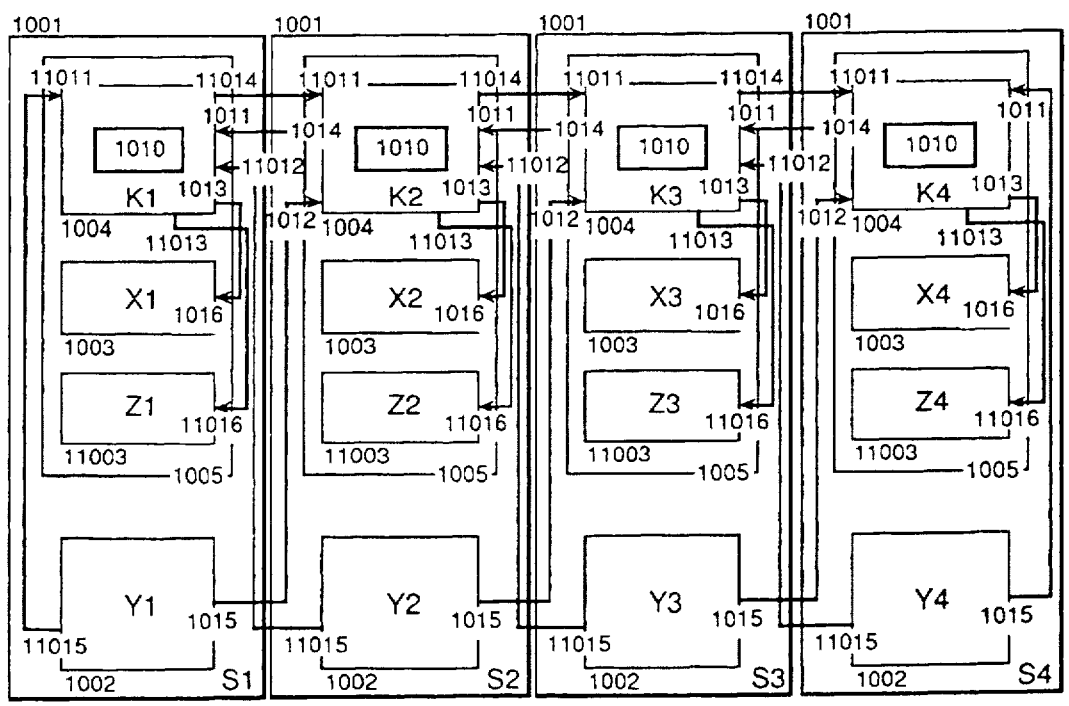
FIG. 11 is a view of an embodiment of a data processing device according to the present invention.

Referring to FIG. 11, a data processing device, which is another embodiment of the present invention, will be explained as follows:

In FIG. 11, components similar to those shown in FIGS. 5 and 10 are given the same numerals and will not be further explained.

This data processing device differs from the embodiment shown in FIG. 10 by the fact that every processor has an additional second data-holding means (11003), and an output (11015) of first data-holding means is connected to a second input (11012) of connecting means of a left processor, a first input (11011) of connecting means is connected to a second output (11014) of the connecting means of the left processor, a first output (11013) of the connecting means is connected to an input (11016) of the second data holding means (11003). The output (11015) of the first data-holding means Y1 of a processor S1 is connected to the first input (11011) of the connecting means K1 of the same processor S1. Since every connecting means has four inputs, it may have 24 (=4×3×2) kinds of connections of its inputs and, therefore, its state variable may assume 24 states.

When input-output connections of processors are made in such a way as 1011 to 1014, 1012 to 1013, 11011 to 11014 and 11012 to 11013 for the processors S2 and S3, 1011 to 1013, 11011 to 11014, 11012 to 11013 for the processor S1 and 1011 to 1014, 1012 to 1013 and 11011 to 11013 for the processor S4, the first data-holding means and the second data-holding means (1003) can transfer data, rotating it rightwards, while the first data-holding means and the additional second data-holding means (11003) can transfer data, rotating it leftwards.

EMBODIMENT 4

Figure 12:
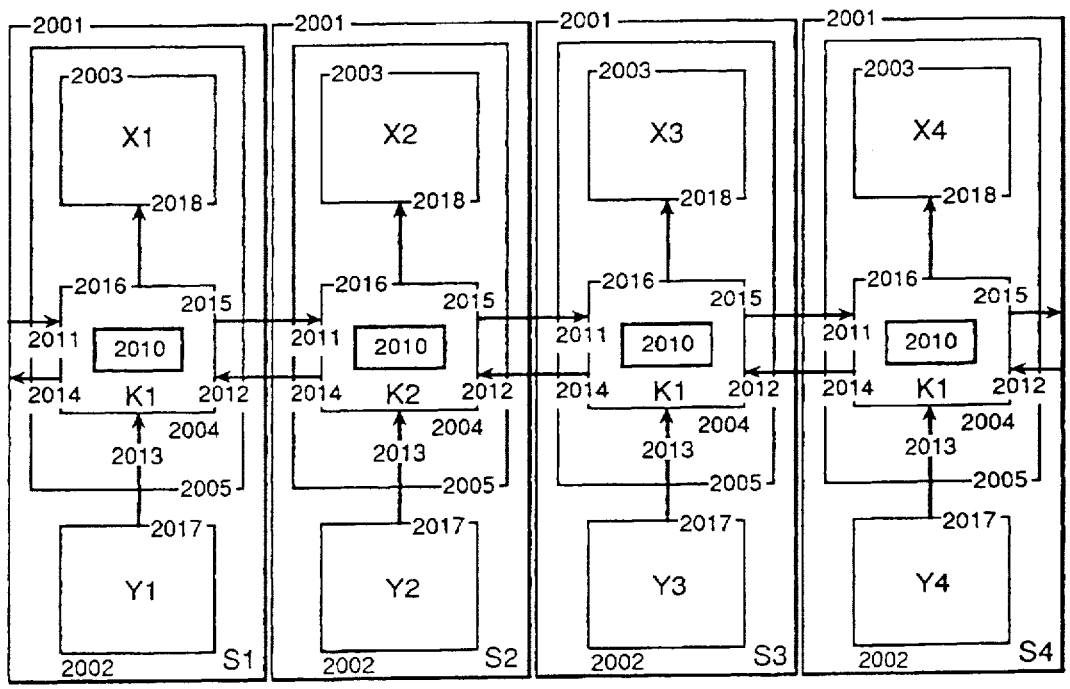
FIG. 12 is a view of an embodiment of a data processing device according to the present invention.

Referring to FIG. 12, an example of a data processing device according to the present invention will be explained as follows:

This data processing device comprises one-dimensionally arranged processors (2001) each of which consists first data-holding means (2002) and storage means (2005) composed of second data-holding means (2003) and connecting means (2004). The connecting means has three inputs, three outputs and a state variable that can take six possible states (2010). A second input (2012) and a second output (2015) of the connecting means are connected to a first output (2014) and a first input (2011), respectively, of connecting means of a right processor. A first input (2011) and first output (2014) of the connecting means are connected to a second output (2015) and a second input (2012), respectively, of connecting means of a left processor. A third output (2016) of the connecting means is connected to an input (2018) of the second data-holding means and a third output of the connecting means is connected to an output (2017) of the first data-holding means.

With the state variable being in the first state, the first input (2011) is connected to the first output (2014), the second input (2012) is connected to the second output (2015) and the third input (2013) is connected to the third output (2016).

With the state variable being in the second state, the first input is connected to the first output, the second input is connected to the third output and the third input is connected to the second output.

With the state variable being in the third state, the first input is connected to the second output, the second input is connected to the first output and the third input is connected to the third output.

With the state variable being in the fourth state, the first input is connected to the second output, the second input is connected to the third output and the third input is connected to the first output.

With the state variable being in the fifth state, the first input is connected to the third output, the second input is connected to the first output and the third input is connected to the second output.

With the state variable being in the sixth state, the first input is connected to the third output, the second input is connected to the second output and the third input is connected to the third output.

When state variables of connecting means of all processors are set in the first state or the third state, an output of first data-holding means Y1 of a processor S1 is connected to an input of second data-holding means X1 of the same processor S1, an output of first data-holding means Y2 of a processor S2 is connected to an input of second data-holding means X2 of the same processor S2, an output of first data-holding means Y3 of a processor S3 is connected to an input of second data-holding means X3 of the same processor S3, an output of first data-holding means Y4 of a processor S4 is connected to an input of second data-holding means X4 of the same processor S4.

Namely, the first data-holding means of each processor is connected to the second data-holding means of the same processor.

When the state variable of the connecting means of the processor S1 is set in the second state, the state variables of the connecting means of the processors S2, S3 are set in the fifth state and the state variable of the connecting means of the processor S4 is set in the sixth state, the output of the first data-holding means Y1 of the processor S1 is connected to the input of the second data-holding means X2 of the processor S2, the output of the first data-holding means Y2 of the processor S2 is connected to the input of the second data-holding means X3 of the processor S3, the output of the first data-holding means Y3 of the processor S3 is connected to the input of the second data-holding means X4 of the processor S4, the output of the first data-holding means Y4 of the processor S4 is connected to the input of the second data-holding means X1 of the processor S1. Namely, the processors S1, S2, S3 and S4 are linked to each other to form a ring circuit wherein data can be rotated from left to right.

When the state variable of the connecting means of the processor S1 is set in the second state, the state variables of the connecting means of the processors S2 and S3 are set in the fourth state and the state variable of the connecting means of the processor S4 is set in the sixth state, the output of the first data-holding means Y1 of the processor S1 is connected to the input of the second data-holding means X4 of the processor S4, the output of the first data-holding means Y4 of the processor S4 is connected to the input of the second data-holding means X3 of the processor S3, the output of the first data-holding means Y3 of the processor S3 is connected to the input of the second data-holding means X2 of the processor S2, the output of the first data-holding means Y2 of the processor S2 is connected to the input of the second data-holding means X1 of the processor S1. Namely, the processors S1, S2, S3 and S4 are linked to each other to form a ring circuit wherein data can be rotated from right to left.

Although the shown embodiment uses 4 processors, it m ay include a larger number of processors in the same way as described above.

Figure 13:
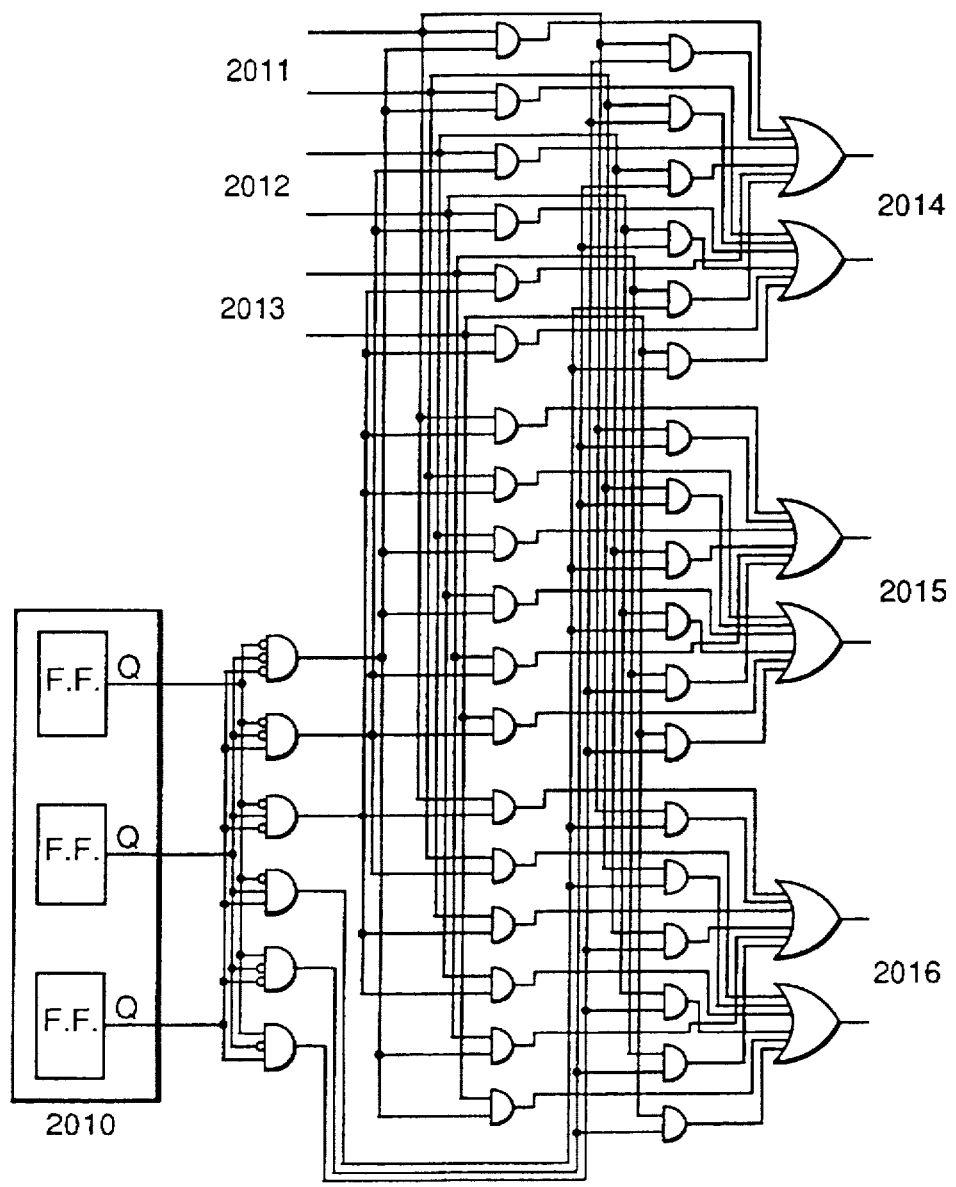
FIG. 13 shows an example of connecting means shown in FIG. 12.
Figure 14:
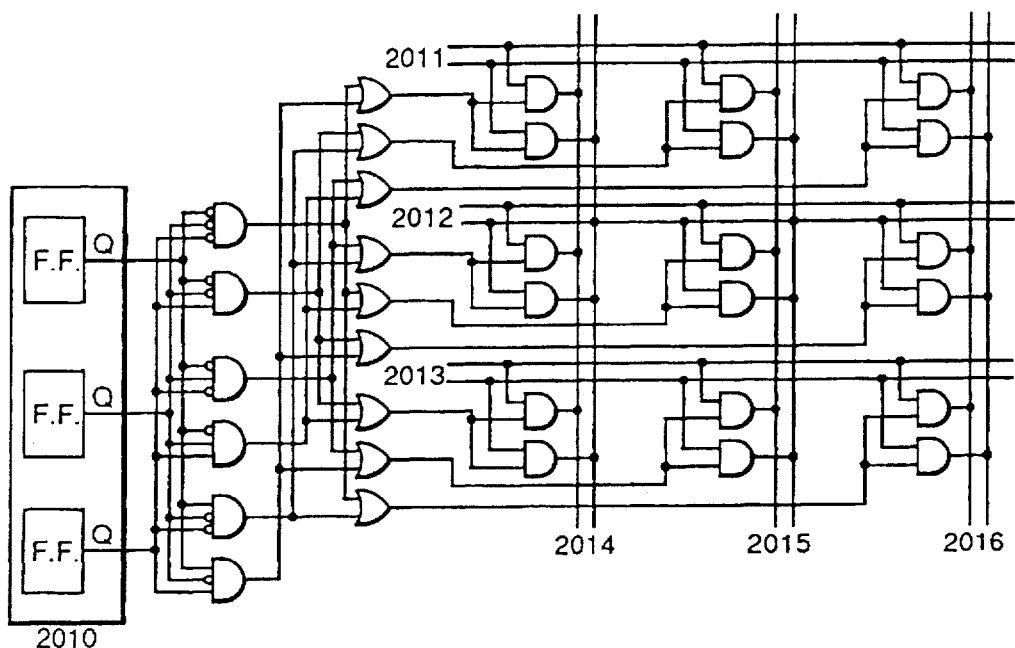
FIG. 14 shows an example of connecting means shown in FIG. 12.

FIGS. 13 and 14 show two different examples, respectively, of connecting means each of which has three two-wired inputs (2011, 2012, 2013) and three two-wired outputs (2014, 2015, 2016) and is used in the data processing device of FIG. 12 composed of electronic circuits.

In both examples, a flip-flop (F.F.) is used as a state variable. With an output "000" (corresponding to the first state) of the flip-flop, a first input (2011) is connected to a first output (2014), a second input (2012) is connected to a second output (2015) and a third input (2013) is connected to a third output (2016).

With an output "101" (i.e., the second state) of the flip-flop, the first input (2011) is connected to the first output (2014), the second input (2012) is connected to the third output (2016) and a third input (2013) is connected to the second output (2015).

With an output "100" (i.e., the third state) of the flip-flop, the first input (2011) is connected to the second output (2015), the second input (2012) is connected to the first output (2014) and a third input (2013) is connected to the third output (2016).

With an output "001" (i.e., the fourth state) of the flip-flop, the first input (2011) is connected to the second output (2015), the second input (2012) is connected to the third output (2016) and a third input (2013) is connected to the first output (2014).

With an output "010" (i.e., the fifth state) of the flip-flop, the first input (2011) is connected to the third output (2016), the second input (2012) is connected to the first output (2014) and a third input (2013) is connected to the second output (2015).

With an output "011" (i.e., the sixth state) of the flip-flop, the first input (2011) is connected to the third output (2016), the second input (2012) is connected to the second output (2015) and a third input (2013) is connected to the first output (2014).

Figure 15:
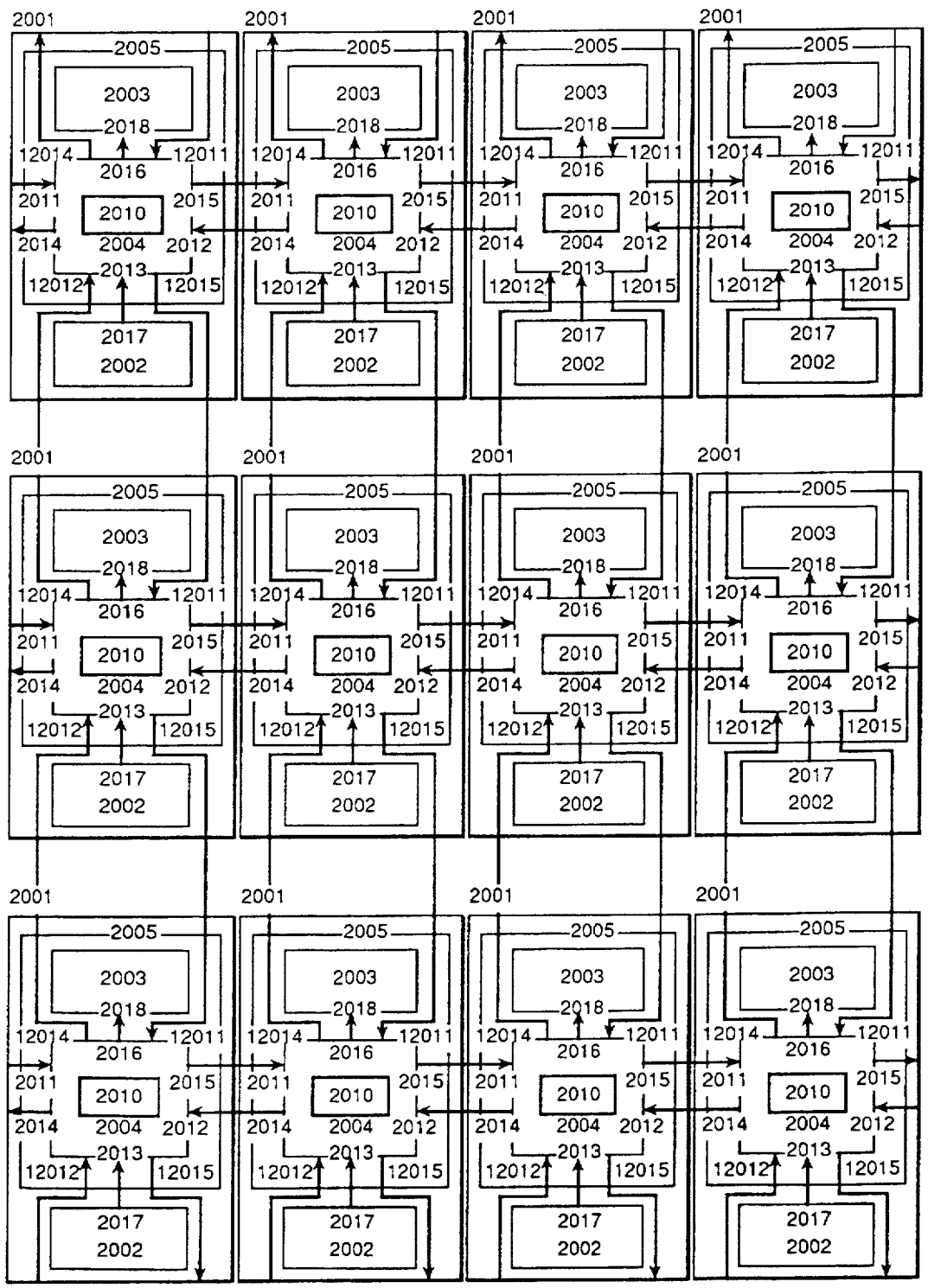
FIG. 15 is a view of an embodiment of a data processing device according to the present invention.

Referring to FIG. 15, another example of the data processing device according to present invention will be described below:

In FIG. 15, components similar to those shown in FIG. 12 are given the same numerals and will not be further explained.

As compared with the device shown in FIG. 12, this data processing device is featured by the two-dimensional arrangement of processors. Accordingly, a first input (12011) and a first output (12014) of connecting means of a processor is connected to a second output (12015) and a second input (12012), respectively, of connecting means of an upper processor, and a second input (12012) and a second output (12015) of the connecting means of the processor is connected to a first output (12014) and a first input (12011), respectively, of connecting means of a lower processor to interconnect vertically arranged processors.

In other words, the connecting means of a processor can be interconnected at its inputs and outputs with respective connecting means of upper, lower, left and right neighboring processors. The connecting means may have 120 (=5×4×3× 2) kinds of input-output connections and may take 120 corresponding states.

Although the shown embodiment uses 4 processors in a row and 3 processors in a column, it may be expanded to include a larger number of processors by combining them in the same way as described above. It is also possible to three-dimensionally arrange processors although the shown embodiment adopts two-dimensional arrangement of the processors therein.

EMBODIMENT 5

Figure 16:
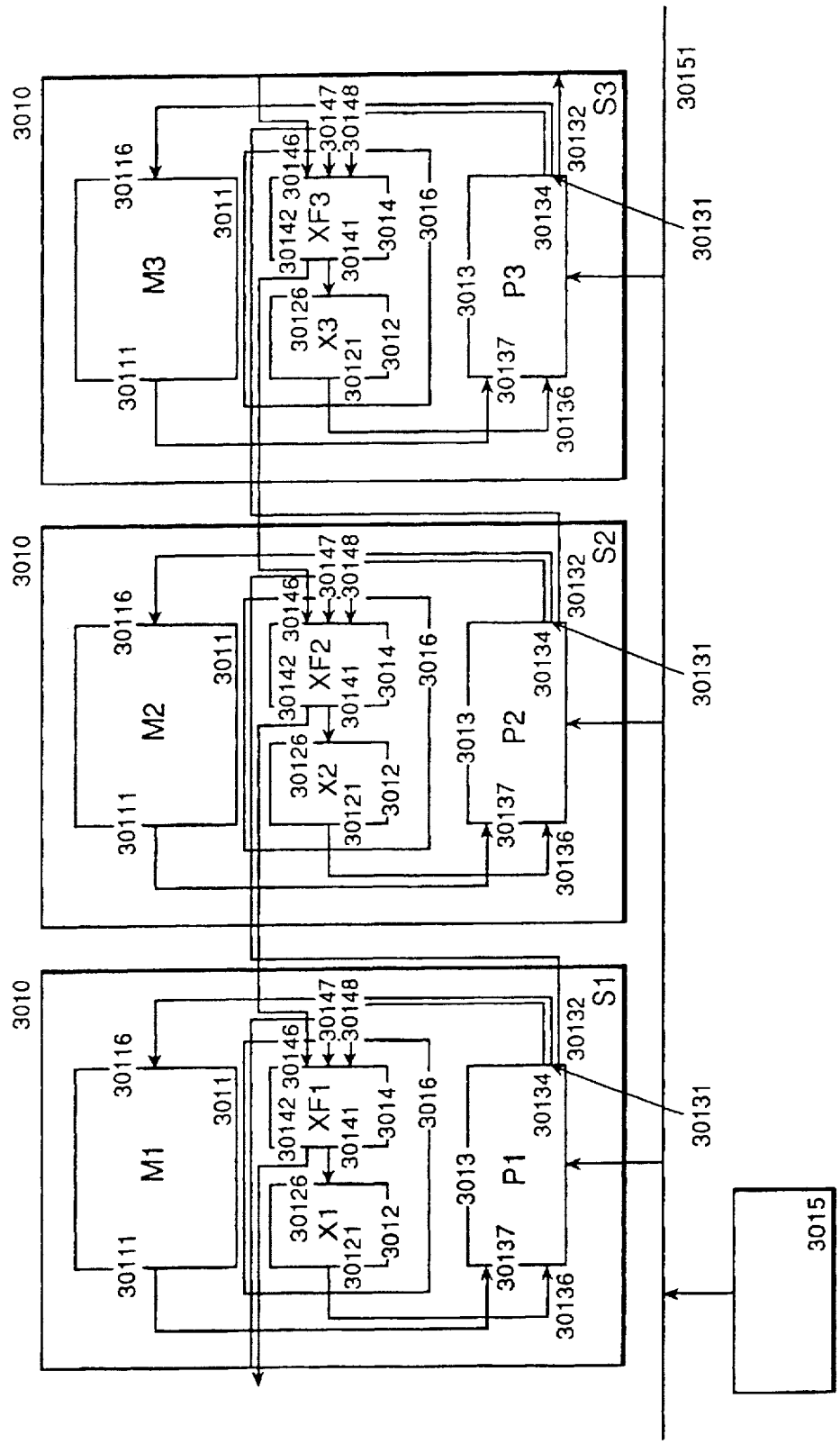
FIG. 16 is a view of an embodiment of a data processing device according to the present invention.

Referring to FIG. 16, a data processing device embodying the present invention will be described as follows:

This embodiment of the present invention represents a SIMD (Single Instruction Multi Data) type data processing device which comprises one-dimensionally arranged processors (3010) each consisting data processing means (3013), memory means (3011) and storage means composed of first register means (3012) and connecting means (3014).

Each processing means of each processor is connected to a global bus (30151) from processor control means (3015) which provides instructions to each processor and reads and writes data in the memory of each processor.

An output (30111) of the memory means is connected to a first input (30136) of the data processing means, an output (30121) of the first register means is connected to a second input (30137) of the data processing means, a first output (30131) of the data processing means is connected to an input (30116) of the memory means, an output (30141) of the connecting means is connected to a first input (30126) of the first register means, a second output (30142) of the connecting means is connected to a first input (30146) of the connecting means of a left processor, a second output (30132) of the data processing means is connected to a second input (30147) of the connecting means of a right processor and a fourth output (30134) of the data processing means is connected to a third input (30148) of the connecting means.

When the third input of the connecting means XF takes the value "0", the first input is connected to the first output and the second input is connected to the second output in the connecting means. When "1" appears at the third input, the first input is connected to the second output and the second input is connected to the first output.

When the value "1" appears at all third inputs of the connecting means XF of all processors, the second output of the data processing means P connected to the connecting means XF of each processor is connected to the register means X of a right processor to which data output from the data processing means P can be transferred.

It is apparent from FIG. 16 that data can be transferred in the reverse direction by reversing the connections between the neighboring processors.

Although the shown embodiment uses 3 processors, it may include a larger number of processors by combining the additional processors in the same way as described above. The above-mentioned embodiment adopts one-dimensional arrangement of processors but it may be constructed of two or more-dimensionally arranged processors.

EMBODIMENT 6

Figure 17:
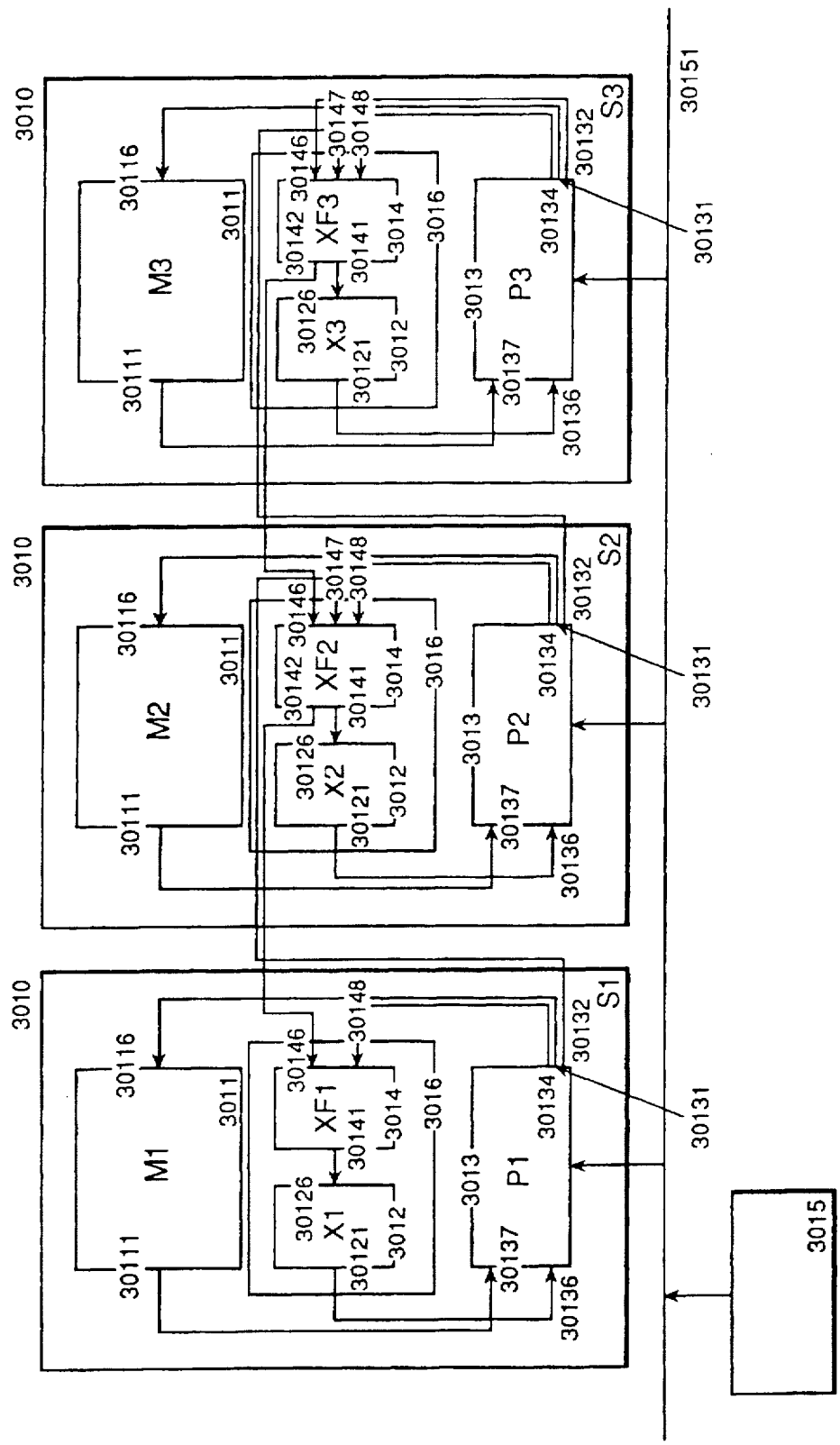
FIG. 17 is a view of an embodiment of a data processing device according to the present invention.

Referring to FIG. 17, a data processing device embodying the present invention will be described below. In FIG. 17, components similar to those of the embodiment of FIG. 16 are denoted by the same reference numerals and will not be further explained.

This embodiment shown in FIG. 17 differs from the embodiment of FIG. 16 by the fact that a second output (30132) of data processing means of a processor is connected to a first input (30146) of its connecting means in the absence of a right neighboring processor.

When the value "0" appears at all third inputs (30148) of the connecting means XF of all processors, the second output of the data processing means P connected to the connecting means XF of each processor is connected to the first register means X of the same processor. Namely, data outputted from the data processing means P can be transferred to the first register means of the same processor. With the value "0" at the third input of connecting means XF1 of a processor S1 and the value "1" at the third inputs of connecting means XF2 and XF3 of processors S2 and S3, a second output of data processing means P1 connected to the connecting means XF1 is connected to register means X2 of the processor S2, a second output of data processing means P2 connected to the connected means XF2 is connected to register means X3 of the processor S3, and a second output of data processing means P3 connected to the connected means XF3 is connected to register means X1 of the processor S1. Namely, data outputted from the data processing means P can be transferred from left to right.

It is apparent from FIG. 17 that data can be transferred from right to left by reversing the connections between the neighboring processors.

Although the shown embodiment uses 3 processors, it may include a larger number of processors by combining the additional processors in the same way as described above. The above-mentioned embodiment adopts one-dimensional arrangement of processors but it may be constructed of two or more-dimensionally arranged processors.

EMBODIMENT 7

Figure 18:
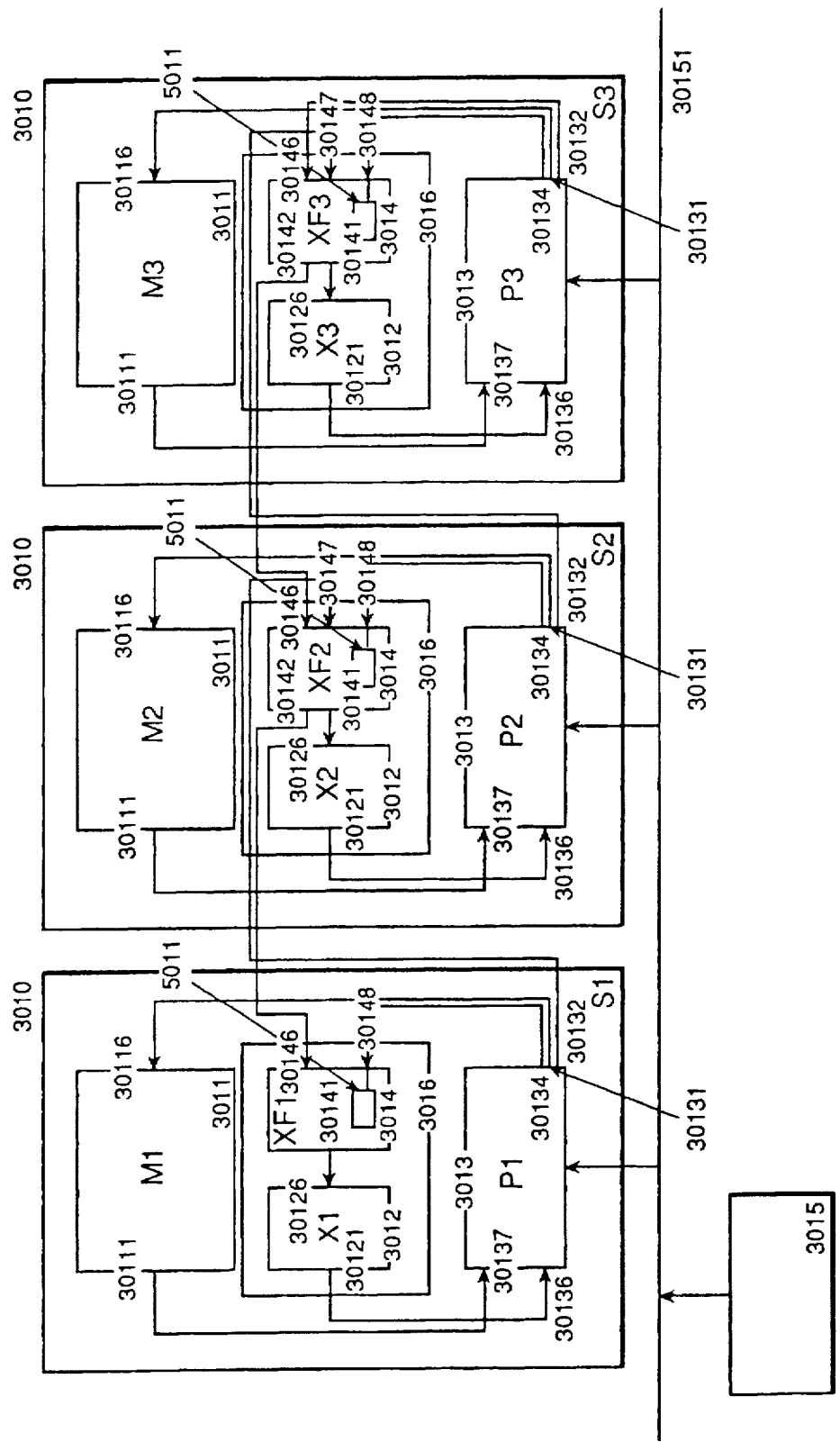
FIG. 18 is a view of an embodiment of a data processing device according to the present invention.

Referring to FIG. 18, a data processing device embodying the present invention will be described below. In FIG. 18, components similar to those of the embodiments of FIGS. 16 and 17 are denoted by the same reference numerals and will not be further explained.

Th is embodiment shown in FIG. 18 is similar to the embodiment of FIG. 17 and differs therefrom by having second register means (5011) connected to a third output (30148) of connecting means.

When the value of a fourth output (30134) of data processing means is written in a second register means at a certain timing and the second register has "0" at its output, a first input is connected to a first output and a second input is connected to a second output. With the value "1" of the second register means, the first input is connected to the second output and the second input is connected to the first output. This brings the same effect as the embodiment 3 above described.

Although the shown embodiment uses three processors, it may include a larger number of processors by combining the additional processors in the same way as described above. The above-mentioned embodiment adopts one-dimensional arrangement of processors but it may be built up of two or more-dimensionally arranged processors.

EMBODIMENT 8

Figure 19:
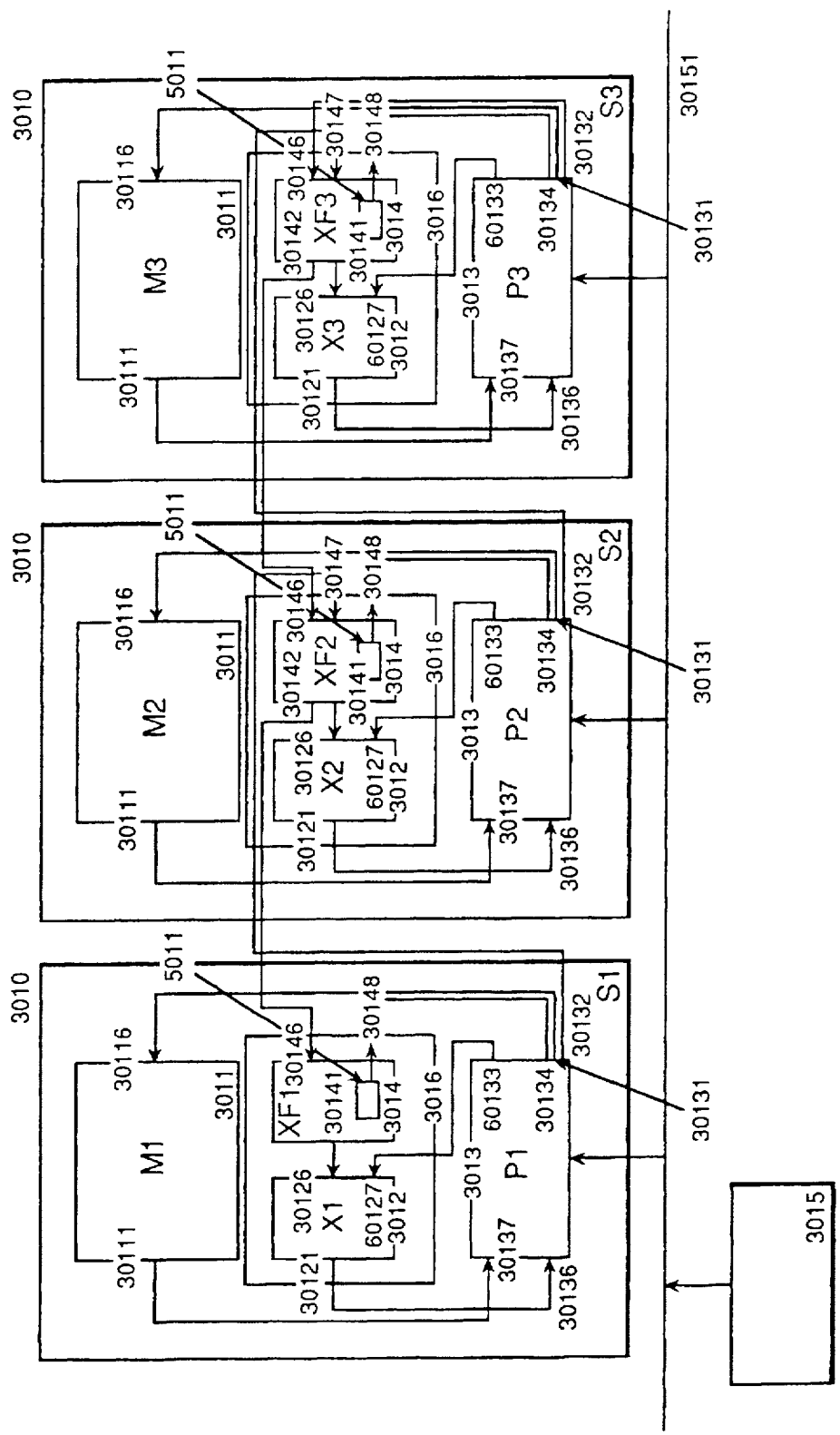
FIG. 19 is a view of an embodiment of a data processing device according to the present invention.

Referring to FIG. 19, a data processing device embodying the present invention will be described below. In FIG. 19, components similar to those of the embodiments of FIGS. 16 to 18 are given the same reference numerals and will not be further explained.

This embodiment shown in FIG. 19 is similar to the embodiment of FIG. 18 and differs therefrom by the fact that a third input (60133) of data processing means is connected to a second input (60127) of first register means.

In the embodiment shown in FIG. 18, the output of the data processing means of a processor can not be written into the first register means of the same processor unless the value "1" is set at the second register means of the connecting means connected to said first register means. It is, however, hard for the device to frequently change the value of the second register means while calculating with rotating data between processors. Accordingly, this embodiment provides means for writing the output information from the data processing means into the first register means of the same processor.

Although the shown embodiment uses 3 processors, it may include a larger number of processors by combining the additional processors in the same way as described above. The above-mentioned embodiment adopts one-dimensional arrangement of processors but it may also realize two or more-dimensional arrangement of the processors.

EMBODIMENT 9

Figure 20:
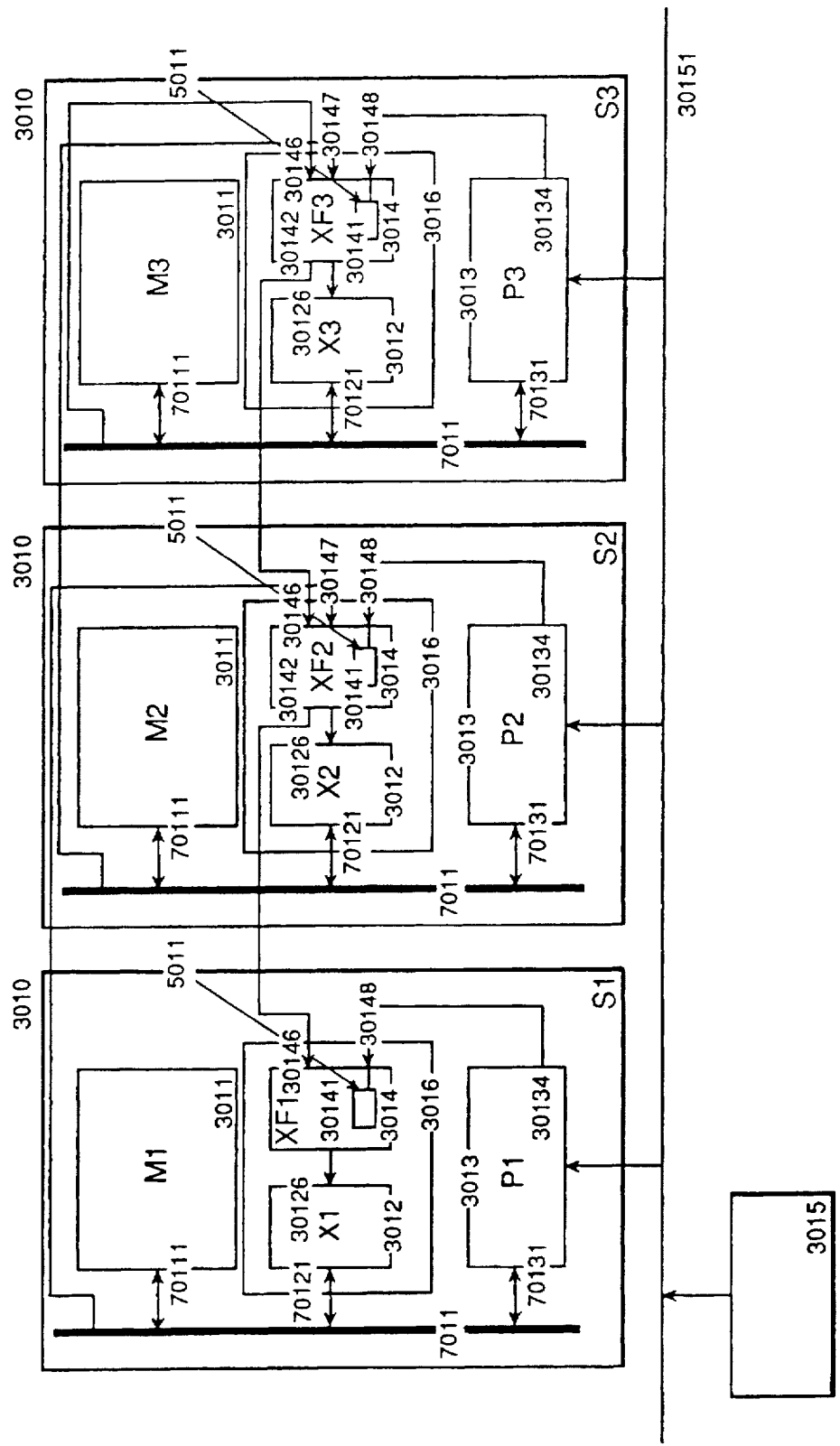
FIG. 20 is a view of an embodiment of a data processing device according to the present invention.

Referring to FIG. 20, a data processing device embodying the present invention will be described below. In FIG. 20, components similar to those of the embodiments of FIGS. 16 to 18 are given the same reference numerals and will not be further explained.

This embodiment shown in FIG. 20 is similar to the embodiment shown in FIG. 19 and differs therefrom by the fact that each processor has an input-output port (70111) (in place of the input 30116 and the output 30111) of memory means (3011), an input-output port (70121) (in place of the first and second inputs 30126, 60127 and the output 30121) of first register means (3012) and an input-output port (70131) (in place of the first and second inputs 30136, 30137 and the first, second and third outputs 30131, 30132, 60133) of data processing means (3013), and these input-output ports and a first and second inputs (30146, 30147) of connecting means (3014) are connected to a first common-use bus (7011).

Data can be transferred from the data processing means to the memory means, the first register means and the connecting means and vice versa through the first common-use bus. The provision of the first common-use bus simplifies the whole circuitry of every processor as compared with the embodiment shown in FIG. 19.

Although the shown embodiment uses 3 processors, it may include a larger number of processors by combining the additional processors in the same way as described above. The above-mentioned embodiment adopts one-dimensional arrangement of processors but it may also realize two or more-dimensional arrangement of the processors.

EMBODIMENT 10

Figure 21:
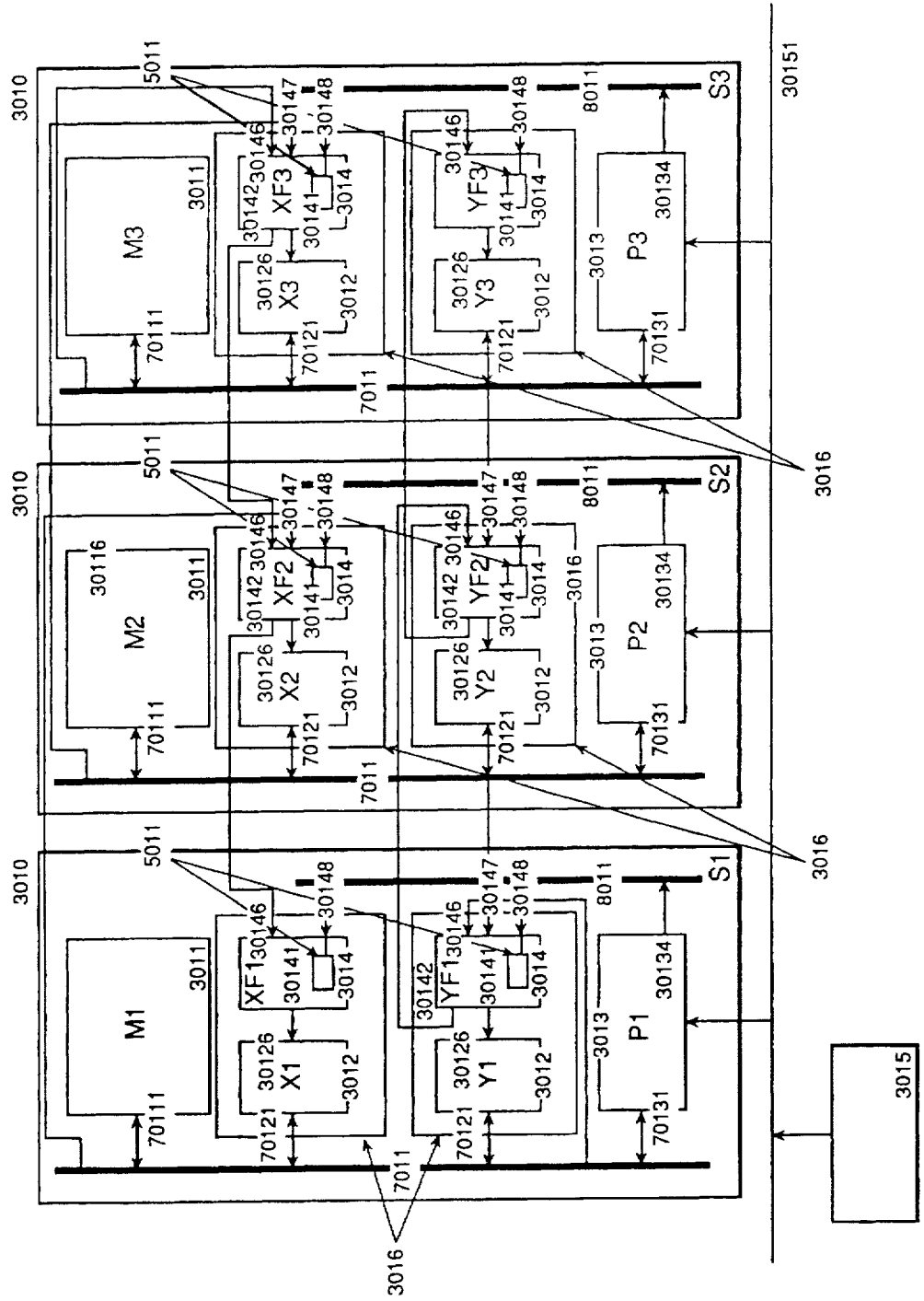
FIG. 21 is a view of an embodiment of a data processing device according to the present invention.

Referring to FIG. 21, an embodiment of a data processing device according to the present invention will be described below. In FIG. 21, components similar to those of the embodiments of FIGS. 16 to 20 are given the same reference numerals and will not be further explained.

This embodiment shown in FIG. 21 is similar to the embodiment shown in FIG. 20 and differs from that embodiment by the fact that each processor has two storage means (3016) and a fourth output (30134) of data processing means and a third input (30148) of connecting means (3014) are connected to a second common-use bus (8011).

In the embodiment of FIG. 20, each processor must have a plurality of the fourth output of the data-processing means if it includes a plurality of the connecting means. This may complicate the circuitry of each processor. Accordingly, present embodiment adopts such a circuitry of every processor that the fourth output of the data processing means and the third input of the connecting means are connected to the second common-use bus.

Although the shown embodiment uses 3 processors, it may include a larger number of processors by combining the additional processors in the same way as described above. The above-mentioned embodiment adopts one-dimensional arrangement of processors but it may also realize two or more-dimensional arrangement of the processors.

Figure 22:
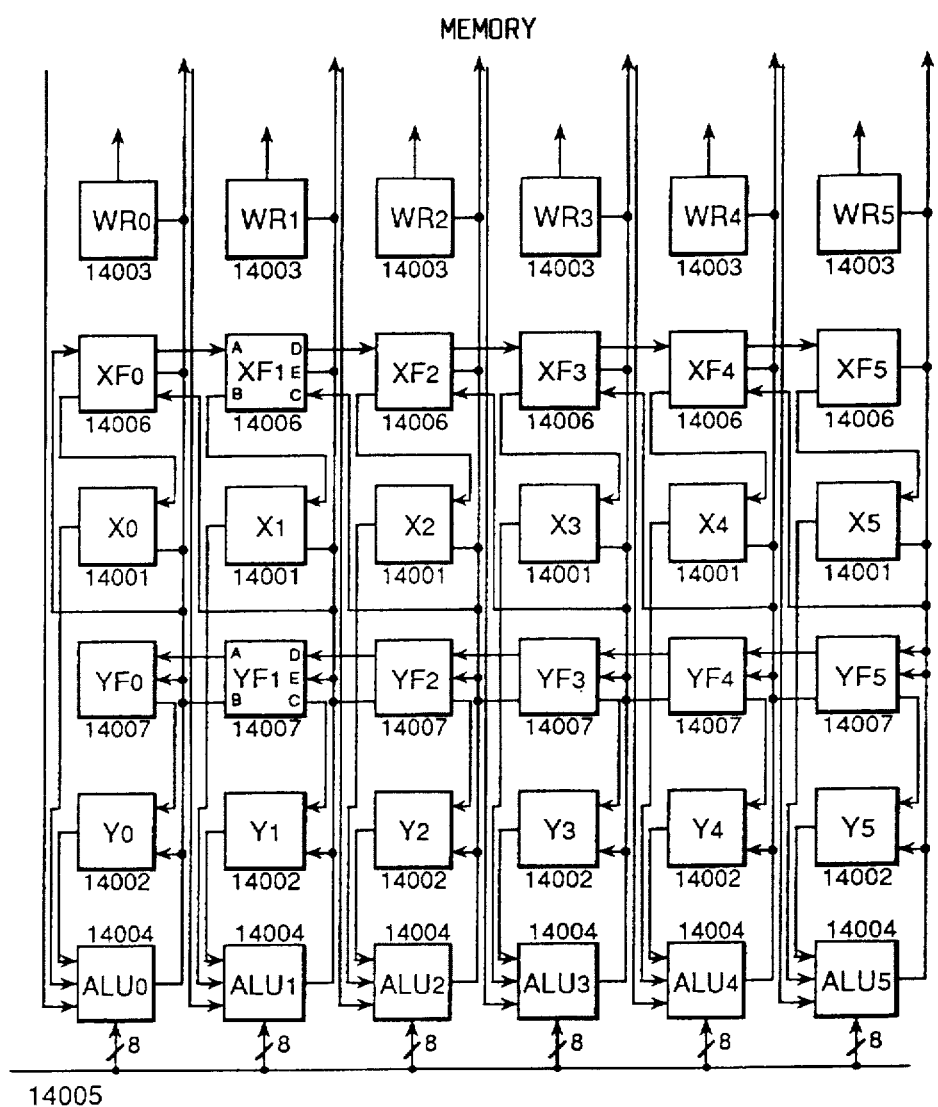
FIG. 22 shows an example of a function memory which incorporates a processor and to which a data processing device of the present invention is applied.

FIG. 22 shows an embodiment of a processor portion of a function memory to which the present invention is applied. This embodiment corresponds to a function memory shown in FIG. 3 (prior art), which is further provided with connecting means (14006, 14007) connectable to an X-register (14001) and Y-register (14002), respectively, of a processor portion.

Figure 23:
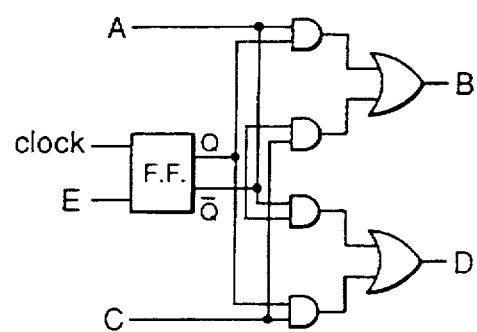
FIG. 23 shows an example of connecting means used in a processor of a function memory shown in FIG. 14.

FIG. 23 shows an example of connecting means used in the processor portion of the function memory shown in FIG. 22. In FIG. 23, characters A, B, C, D and E correspond to connecting points A, B, C, D and E, respectively, of the processor connecting means (XF1, YF1) shown in the second column from the left in FIG. 22. When a flip-flop (F.F.) assumes state "0", points A and D are interconnected and points C and B are interconnected. When the flip-flop (F.F.) assumes state "1", points A and B are interconnected and points C and D are interconnected.

Data can be rotated leftwards if flip-flops XF0 to XF are set at "0" and a flip-flop XF5 is set at "1". On the contrary, data can be rotated rightwards if flip-flops YF1 to YF5 are set at "0" and a flip-flop YF0 is set at 1.

Although the shown embodiment comprises 6 processors, it may include a larger number of processors by combining the additional processors in the same way as described above. The above-mentioned embodiment adopts one-dimensional arrangement of processors but it may also realize two or more-dimensional arrangement of the processors.

EMBODIMENT 11

Figure 24:
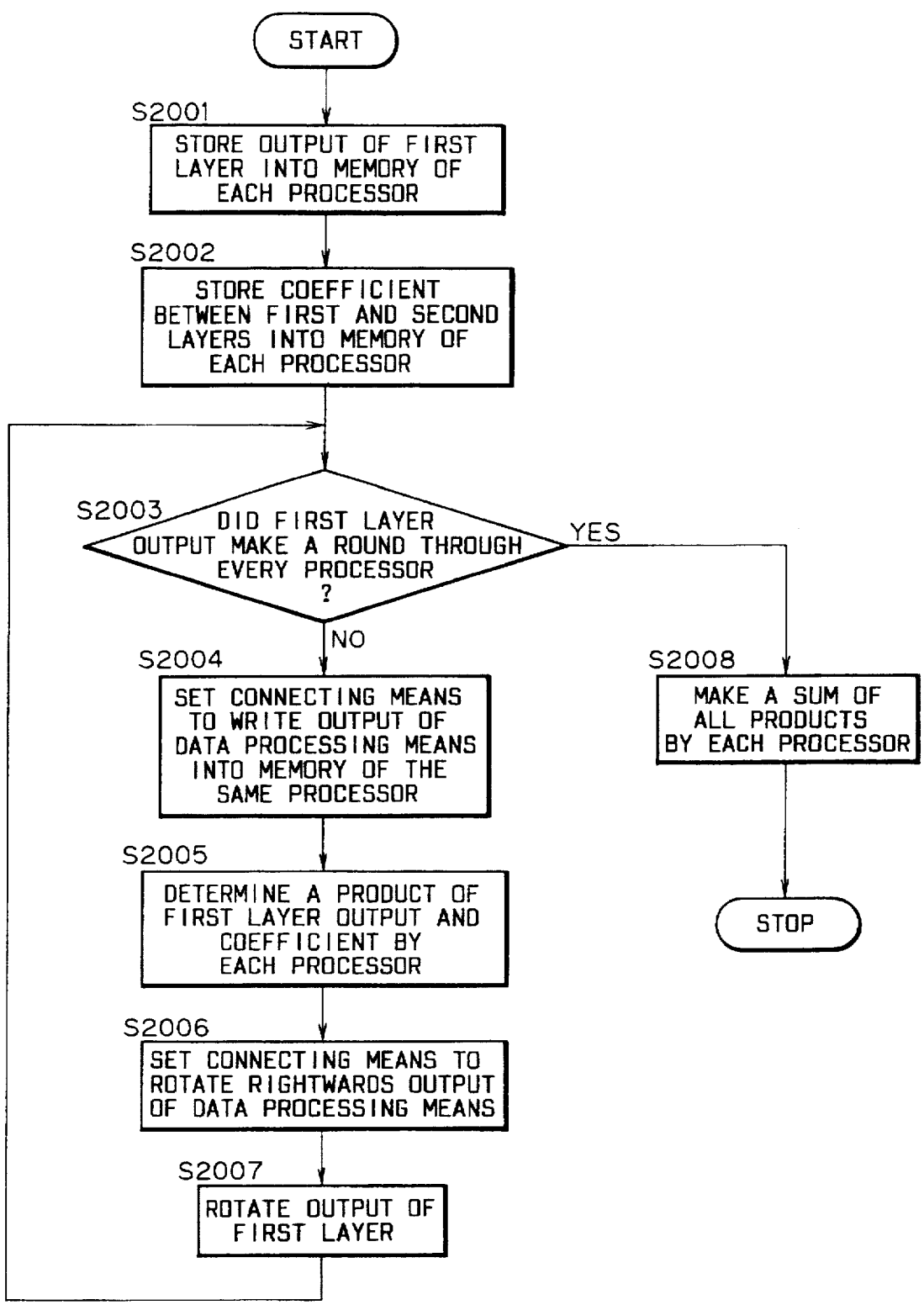
FIG. 24 is a flow chart showing an example of operations with a neural net according to the present invention.

FIG. 24 is a flow chart describing an example of a data processing method for performing arithmetic operations on a neural net according to the present invention.

Figure 25A:
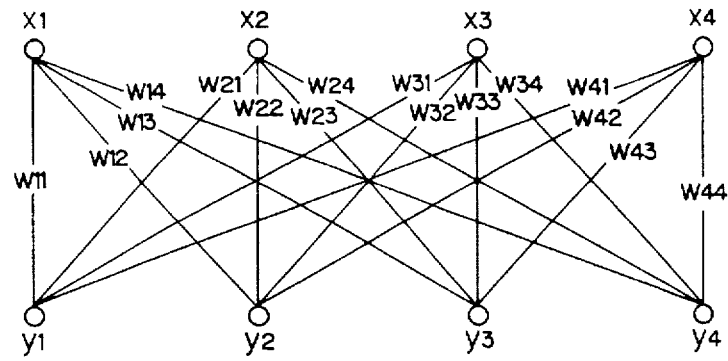
FIGS. 25A, 25B and 25C show examples of neural nets which are different in structure.
Figure 25B:
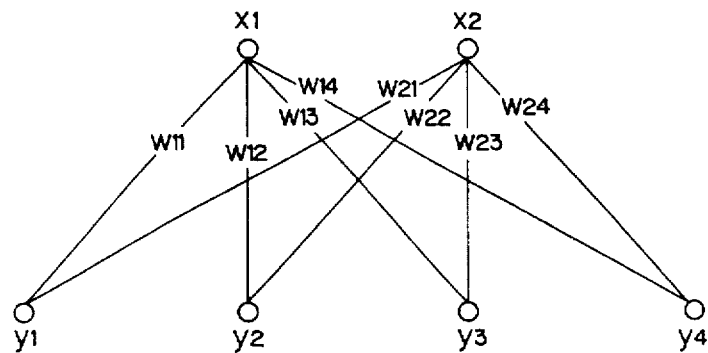
Figure 25C:
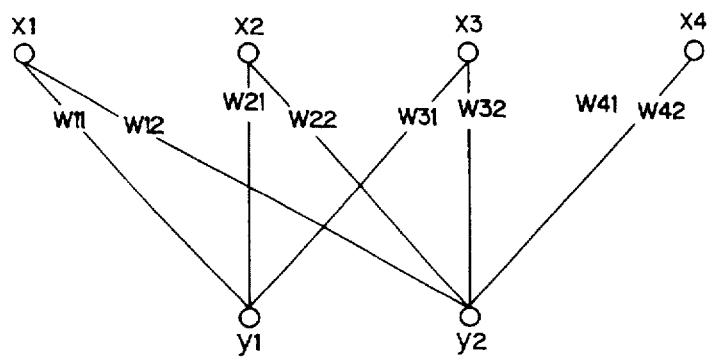

A neural net normally has a completely inter-connected two-layered structure as shown in FIGS. 25A, 25B and 25C. Neural nets having three or more layers are usually used rather than two-layered nets, but two-layer type neural nets are shown for simplifying the further explanation.

The arithmetic operation on a neural net is generally expressed by the following equation:

$$y_j = \frac{1}{1+e^{-\sum_{i}^{n} x_i \cdot W_{ij}}}$$

In the equation, $y_j$ is an output of a node j of a second layer, $X_i$ is an output of a node i of a first layer and $W_{ij}$ is a weighting coefficient from the node i to the node j.

FIG. 25A shows a neural net having the same number of nodes in the first layer and second layer, FIG. 25B shows a neural net whose first layer has fewer nodes than the second layer and FIG. 25C shows a neural net whose first layer has more nodes than the second layer.

Equation (1) includes the following expression for determining a sum of products:

$$\sum_{i}^{n} X_i \cdot W_{ij}$$

The arithmetic operation according to the above-mentioned expression will be described below, referring to a flow chart shown in FIG. 24.

It is assumed that the first layer has m nodes, the second layer has n nodes and the arithmetic operation is conducted by using P sets of successively interconnected processors (P is larger one of "n" and "m").

At Step S2001, an output from the k-th node $X_k$ in the first layer is stored into a memory of the k-th ($1 \leq k \leq P$) processor, whose memory address is accessible by every processor at a time. A zero is stored therein if there is no corresponding element.

At Step S2002, a coefficient $W_{ik}$ ($1 \leq i \leq n$) between each k-th node $X_i$ ($1 \leq i \leq n$) in the first layer and each k-th node $Y_k$ in the second layer are stored into a memory of the k-th ($1 \leq k \leq P$) processor, whose $W_{pk}$ (p is a remainder after dividing (i+k−1) by P, but p is P if 0) address is accessible by every processor at a time. A zero is stored therein if there is no corresponding coefficient.

At Step S2003, a check is made to know whether an output of the first layer has rotated through every processor. If not, Step S2004 is executed.

At Step S2004, every connecting means is set so that an output of data processing means of every processor may be written into the memory of the same processor.

At Step S2005, an output of the first layer is multiplied by the coefficient by each processor and the product is stored in the memory of each processor.

At Step S2006, every connecting means is set so that an output from the data processing means may rotate rightwards.

At Step S2007, an output from the first layer is rotated rightwards.

If the check result at Step S2003 is YES, Step S2008 is executed. An output of each node of the second layer is determined by summing the products obtained at Step S2008 for each processor.

A product of the matrix A and the matrix B is thus obtained.

FIG. 26 shows the process of calculation on the neural net shown in FIG. 25A. In this instance, a SIMD type data processing device having 4 processors 0 to 3 works by transferring data by rotation from right to left. Characters A–K shown at the left side denote memory addresses.

In FIG. 26, state (1) shows that an output X1 of the first layer and weighting data $W_{ij}$ between nodes are stored in a memory; state (2) shows that a value of address A is multiplied by a value of address B by each processor and the product is stored in address F for each processor; state (3) shows that data sets in addresses A are rotated to left; state (4) shows that a value of address A is multiplied by a value of address C and the product is stored in address G; state (5) shows that data sets in addresses A are rotated to left; state (6) shows that a value of address A is multiplied by a value of address D and the product is stored in address H; state (7) shows that data sets in addresses are rotated to left; and state (8) shows that a value of address A is multiplied by a value of address E and the product is stored in address I.

Finally, contents of addresses F–I are summed together for each processor. A sum of products:

$$\sum_{i}^{n} x_i \cdot W_{ij}$$

is thus executed.

FIG. 27 shows another example of calculation on a neural net shown in FIG. 25C. This process is similar in calculation method and conditions to the process shown in FIG. 26 and differs therefrom only by a method for storing data $W_{ij}$. In this instance, the data $W_{ij}$ is stored in processors P0 and P1. The similar calculations are conducted and the results are obtained at the processors P0 and P1 respectively.

FIG. 28 shows another example of calculation on a neural net shown in FIG. 25B. This process is similar in calculation method and conditions to the process shown in FIG. 26 and differs therefrom only by a method for storing data $X_i$ and $W_{ij}$. In this instance, the data $X_1$ is stored in processors P0 and P1 and the data $W_{ij}$ is stored in processors P0 to P3. The similar calculations are conducted and the results are obtained at the processors P0 to P3 respectively.

EMBODIMENT 12

Figure 29:
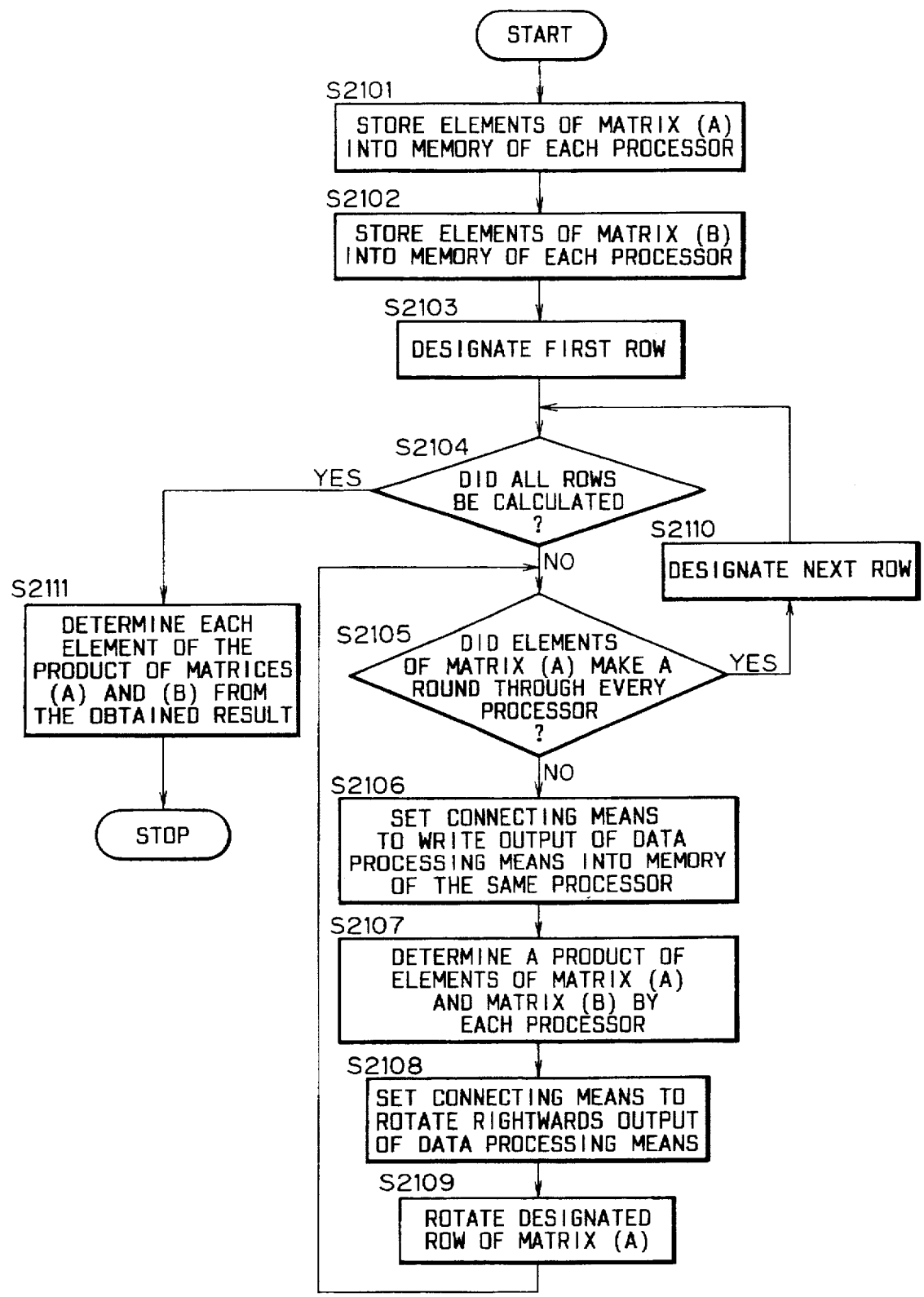
FIG. 29 is a flow chart of an exemplified data processing method for calculating a product of two matrices according to the present invention.

FIG. 29 is a flow chart describing an example of a data processing method for multiplying two matrices according to the present invention.

Referring FIG. 29, the processing flow chart will be described below.

It is assumed that a matrix A is of n×m in size and a matrix B is of m×1 in size and calculations will be conducted by using P sets of continuous processors (P is larger one of two numbers "m" and "1") of sequential processors.

At Step S2101, elements $a_{ik}$ ($1 \leq i \leq n$) in k-th column of the matrix A are stored in a memory of a k-th ($1 \leq k \leq P$) processor and data in the same row are stored in an address accessible by every processor at a time. A zero is stored therein if there is no corresponding element.

At Step S2102, element $b_{ik}$ ($1 \leq i \leq m$) in k-th column of the matrix B or $b_{pk}$ (p is the rest after dividing (i+k−1) by P, but p is P if 0) are stored into a memory of the k-th ($1 \leq k \leq P$) processor, whose address is accessible by every processor at a time. A zero is stored therein if there is no corresponding element.

At Step S2103, the first row is designated.

At Step S2104, a check is made to know whether all rows of the matrices have been calculated. If not, Step S2105 is executed.

At Step S2105, a check is made to know whether elements in the designated row of the matrix A have rotated through every processor. If the check result is "NO", Step S2106 is executed.

At Step S2106, every connecting means is set so that an output of data processing means of each processor may be written into the memory of the same processor.

At Step S2107, the product of elements of the designated row of the matrix A and each element of the matrix B is calculated by each processor and a calculation result is stored in a memory of each processor.

At Step S2108, every connecting means is set so that an output from the data processing means may rotate rightwards.

At Step S2109, the designated row of the matrix A is rotated rightwards.

If the check result at Step S2105 is "YES", Step S2110 is executed.

At Step S2110, a next row is designated and Step S2104 is executed.

If the check result at Step S2105 is YES, Step S2111 is executed.

At Step S2111, each element of multiplied matrices A and B is determined from the obtained product.

The product of the matrix A and the matrix B is thus obtained.

FIG. 30 shows the process for calculating a product of a matrix A of 3×3 in size and a matrix B of 3×3 in size. In this instance, a SIMD type data processing device having 3 processors 0 to 2 works by transferring data by rotation from right to left. Characters A–Q shown at the left side denote memory addresses.

FIG. 30 shows: state (1) that every element of the matrices A and B are stored in memories of the processors; state (2) that a value of address A is multiplied by a value of address D and the product of the values is stored in address G, a value of address B is multiplied by a value of address E and the product of the values is stored in address H, and a value of address C is multiplied by a value of address F and the product of the values is stored in address I; state (3) that data sets in addresses A, B and C are rotated to left; state (4) that a value of address A is multiplied by a value of address D and the product of values is stored in address J, a value of address B is multiplied by a value of address E and the product is stored in address K, a value of address C is multiplied by a value of address F and the product is stored in address L; state (5) that data sets in addresses A, B and C are rotated to left; and state (6) that a value of address A is multiplied by a value of address D and the product is stored in address M, a value of address B is multiplied by a value of address E and the product is stored in address N, and a value of address C is multiplied by a value of address F and the product is stored in address O. Finally, contents of addresses G, J, M and H, K, N and I, L, O are summed up to determine a product of two matrices A and B.

A data processing device or method according to the present invention provides effects and merits below:

A data processing device of the present invention can efficiently transfer data from a processor to another physically or logically distant processor.

A data processing device of the present invention can efficiently transfer data by rotation in a group of physically or logically continuous processors.

A data processing device of the present invention can efficiently conduct at a time a plurality of calculations by summing products such as the product of a plurality of matrices since it can efficiently transfer data by rotation in a group of physically or logically continuous processors.

A data processing device of the present invention can include a processor disposed at a terminal end into a group of physically or logically continuous processors and can effectively use the processors by transferring data by rotation among the processors.

A data processing device of the present invention can efficiently transfer data in both directions between physically or logically distant processors.

A data processing device of the present invention can transfer data to the first register means through the connecting means with no need of giving a connection command to the fourth output of the data processing means by previously storing data in the second register means of the connecting means through the fourth output of the data processing means, thereby realizing compact data-processing means.

A data processing device of the present invention can efficiently transfer data from each processor to its first register means omitting the connecting means (i.e., without changing the state of the connecting means), thereby improving the efficiency of data processing.

A data processing device of the present invention can have simplified in construction processors each of which may transfer data over a common-use bus to which inputs and outputs of its memory means, first register means and data processing means and an input of its connecting means are connected.

A data processing device of the present invention can have simplified in construction processors each having a plurality of connecting means therein by connecting the third input of the connecting means with the fourth output of the data processing means by using the common-use bus.

A data processing method of the present invention can efficiently conduct calculations on a neural net by using a plurality of processors as well as parallel calculations with a plurality of neural nets at a time.

A data processing method of the present invention can efficiently conduct calculation of a product of two matrices by using a plurality of processors as well as parallel determination of a plurality of products of matrices at a time.

I claim:

1. A data processing device comprising one-dimensionally or multi-dimensionally interconnected processors each of which comprises a first data-holding means for storing data and a storage means consisting of one or more second data-holding means for storing data and a connecting means, wherein the connecting means of each processor has at least two inputs, at least two outputs and a state variable for setting input-output connections: the first input of the connecting means is connected to a second output of connecting means of a first physically or logically neighboring processor; the first output of the connecting means is connected to an input of the second data-holding means disposed in the same storage means wherein the connecting means exists; the second input of the connecting means is connected to an output of a first data-holding means of connecting means of a second physically or logically neighboring processor; the second output of the connecting means is connected to a first input of the first data-holding means of connecting means of the second physically or logically neighboring processor, and the input-output connections of the connecting means can be changed according to a state value of the state variable.

2. A data-processing device as defined in claim 1, wherein the output of the first data-holding means of a processor located at a physically or logically terminal point is connected to the first input of said processor in the absence of connecting means of the first neighboring means.

3. A data processing device as defined in claim 1, wherein the connecting means has, as first inputs and second outputs, at least two respective inputs and at least two respective outputs, which first inputs and second outputs are connected to the second outputs and the first inputs, respectively, of the first and the second neighboring processors, and the first data-holding means has two outputs which first output is changeably connected to the second inputs, respectively, of the connecting means of the first and the second neighboring processors.

4. A data processing device comprising one-dimensionally or multi-dimensionally interconnected processors each comprising data-holding means for storing data and a storage means consisting of one or more second data-holding means for storing data and a connecting means, wherein the connecting means of each processor has at least three inputs, at least three outputs and a state variable for setting input-output connections: a second input and a second output of the connecting means are connected to a first output and a first input, respectively, of connecting means of a first physically or logically neighboring processor; a first input and a first output of the connecting means are connected to a second output and a second input, respectively, of connecting means of a second physically or logically neighboring processor; a third output of the connecting means is connected to an input of the data holding means disposed in the same storage means wherein the connecting means exists; a third input of the connecting means is connected to an output of the first data-holding means; and the above-mentioned input-output connections of the connecting means can be changed depending upon a state value of the state variable.

5. A data processing device which is a SIMD type parallel data-processing device comprising one-dimensionally or multi-dimensionally interconnected processors each of which comprises data processing means, memory means and one or more storage means consisting of a first register means and a connecting means, wherein an output of the memory means is connected to a first input of the data processing means, an output of the first register means is connected to a second input of the data processing means, a first output of the data processing means is connected to an input of the memory means, a first output of the connecting means is connected to a first input of the first register means disposed in the same storage means wherein the connecting means exists, a second output of the connecting means is connected to a first input of connecting means of a second physically or logically neighboring processor, a second output of the data processing means is connected to a second input of connecting means of a first physically or logically neighboring processor, a fourth output of the data processing means is connected to a third input of connecting means, and the connections of the first and second inputs and the first and second outputs of the connecting means can be changed depending upon to a value of the third input of the connecting means.

6. A data processing device as defined in claim 5, wherein the output of the first data-processing means of a processor located at a physically or logically terminal point is connected to the first input of said processor's connecting means instead of absent connecting means of the first neighboring means.

7. A data processing device as defined in claims 5, wherein the connecting means has a second register means connected to a third input of the connecting means, the second register means maintains a value of the third input of the connecting means and the connections of the first and second inputs and the first and second outputs of the connecting means can be changed depending upon a value of the third input of the connecting means.

8. A data processing device as defined in claim 5, wherein in the processor, a third output of the data processing means is connected to a second input of the first register means.

9. A data processing device as defined in claim 5, wherein the processor has an input-output port in place of an input and an output of the memory means, has an input-output port in place of a first and second inputs and output of the first register means and has an input-output port in place of a first and second inputs and first, second and third outputs of the data processing means, and the input-output ports and first and second inputs of the connecting means are connected to a first common-use bus.

10. A data processing device as defined in claim 5, wherein in the processor including a plurality of storage means, a fourth output of the data processing means and a third output of the connecting means are connected to a second common-use bus.

11. A method for performing arithmetic operations on a neural net combining m pieces of nodes $X_i$ ($1 \leq i \leq m$) of a first layer with n pieces of nodes $Y_j$ ($1 \leq j \leq n$) of a second layer by using a data processing device defined in claim 5, which method uses the larger successive number m or n (denoted by P) of the processors to store an output of a node $X_k$ of the first layer into memory means of the k-th ($1 \leq k \leq P$) processor or store 0 thereinto in the absence of the corresponding node, store a coefficient $W_{ik}$ ($1 \leq i \leq m$) for combining each node $X_i$ ($1 \leq i \leq m$) of the first layer with a k-th node $Y_k$ of the second layer or $W_{pk}$ (p is a residue after dividing (i+k−1) by P but it takes P if 0) into an address accessible by the processors at the same time or store 0 in the absence of the corresponding coefficient, rotate the output of the node X to the right or the left by setting the connecting means so as to rotate the output of the data processing means to the right or the left, determine a sum of products of an output of the node X and the coefficient by each processor to get an output of the node Y.

12. A method for performing arithmetic operations on calculating a product of a matrix A having a size of n×m and a matrix B having a size of m×l by using a data processing device defined in claim 5, which method uses the larger successive number m or l (denoted by P) of the processors to store elements $a_{ik}$ ($1 \leq i \leq n$) in a k-th column of the matrix A into memory means of the k-th ($1 \leq k \leq P$) processor or stores 0 thereinto in the absence of the corresponding elements of the matrix A, store data in the same row into an address accessible by the processors at the same time, store data $b_{ij}$ ($1 \leq i \leq m$) in the j-th column of the matrix B or $b_{pj}$ (p is a remainder after dividing (i+j−1) by P but it takes P if 0) into an address accessible by the processors at the same time or store 0 in the absence of the corresponding elements of the matrix B, rotate the output of the data of the matrix A to the right or the left by setting the connecting means so as to rotate the output of the data processing means to the right or the left, determine a sum of products of the elements of the matrix A and the elements of the matrix B by each processor.

* * * * *